(12) United States Patent
Hwang et al.

(10) Patent No.: US 12,520,341 B2
(45) Date of Patent: Jan. 6, 2026

(54) METHOD FOR SHARING MULTILINK IN NEXT-GENERATION WIRELESS LAN

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Sejong (KR); Su Na Choi, Daejeon (KR); Yong Ho Kim, Incheon (KR); Yong Su Gwak, Seoul (KR)

(73) Assignees: Electronics and Telecommunications Research Institute, Daejeon (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 374 days.

(21) Appl. No.: 17/761,029

(22) PCT Filed: Sep. 16, 2020

(86) PCT No.: PCT/KR2020/012476
§ 371 (c)(1),
(2) Date: Mar. 16, 2022

(87) PCT Pub. No.: WO2021/054712
PCT Pub. Date: Mar. 25, 2021

(65) Prior Publication Data
US 2022/0338251 A1 Oct. 20, 2022

(30) Foreign Application Priority Data

Sep. 16, 2019 (KR) .......... 10-2019-0113804
Nov. 11, 2019 (KR) .......... 10-2019-0143163

(51) Int. Cl.
*H04W 74/04* (2009.01)
*H04B 7/0452* (2017.01)
(Continued)

(52) U.S. Cl.
CPC .......... *H04W 74/04* (2013.01); *H04B 7/0452* (2013.01); *H04W 74/002* (2013.01); *H04W 84/12* (2013.01)

(58) Field of Classification Search
CPC ............. H04W 74/002; H04W 74/004; H04W 74/006; H04W 74/008; H04W 74/04;
(Continued)

(56) References Cited

U.S. PATENT DOCUMENTS

| 8,842,624 B2 | 9/2014 | Trachewsky |
| 2012/0163360 A1 | 6/2012 | Cheong et al. |

(Continued)

FOREIGN PATENT DOCUMENTS

| WO | 2013/049136 A1 | 4/2013 |
| WO | 2016/140519 A1 | 9/2016 |

(Continued)

*Primary Examiner* — Peter Chen
(74) *Attorney, Agent, or Firm* — Rabin & Berdo, P.C.

(57) ABSTRACT

A method for sharing a multilink in a next-generation wireless LAN is disclosed. An operation method of a first communication node comprises the steps of: setting a transmission interval; communicating with a second communication node by using a first link and a second link in the transmission interval; sharing the transmission interval with
(Continued)

a third communication node; and communicating with the second communication node by using the first link in the transmission interval.

8 Claims, 22 Drawing Sheets

(51) Int. Cl.
*H04W 74/00* (2009.01)
*H04W 84/12* (2009.01)

(58) Field of Classification Search
CPC ......... H04W 74/0808; H04W 74/0816; H04W 74/0825; H04W 84/12; H04W 72/0446; H04B 7/0413; H04B 7/0452
See application file for complete search history.

(56) References Cited

U.S. PATENT DOCUMENTS

| | | |
|---|---|---|
| 2012/0182963 A1 | 7/2012 | Kneckt et al. |
| 2014/0119303 A1 | 5/2014 | Kwon et al. |
| 2014/0334387 A1* | 11/2014 | Doppler ............ H04W 74/0816 370/329 |
| 2015/0055546 A1 | 2/2015 | Jafarian et al. |
| 2016/0157266 A1 | 6/2016 | Wang et al. |
| 2016/0330764 A1* | 11/2016 | Kim ...................... H04W 74/02 |
| 2017/0026947 A1 | 1/2017 | Kim et al. |
| 2019/0044586 A1 | 2/2019 | Seok |

FOREIGN PATENT DOCUMENTS

| | | |
|---|---|---|
| WO | 2016/179313 A1 | 11/2016 |
| WO | 2017/065875 A1 | 4/2017 |
| WO | 2017/164638 A1 | 9/2017 |
| WO | 2018/143600 A1 | 8/2018 |

* cited by examiner

METHOD FOR SHARING MULTILINK IN NEXT-GENERATION WIRELESS LAN

TECHNICAL FIELD

The present invention relates to a communication technique in a wireless LAN, and more specifically, to a communication technique according to characteristics of data in a next generation wireless LAN supporting multi-links.

BACKGROUND ART

With the advancement of the information age, wireless LAN (WLAN) technology is in the spotlight. The wireless LAN technology is a technology that connects two or more devices by applying orthogonal frequency division multiplex (OFDM) technology. This allows users to continuously access a network while moving at any time in a place where a wireless network equipment exists, such as home or office. Most wireless LAN technologies today are based on the Institute of Electrical and Electronics Engineers (IEEE) 802.11 standards and are well known under the marketing name of 'Wi-Fi'. In particular, since the core technologies of the 4th industrial revolution era, such as artificial intelligence and autonomous driving technology, need to process a large amount of data in real time, the wireless LAN technology, which has a lower operating cost compared to cellular communications, is getting more attention, and many studies are currently being conducted.

The wireless technology is being standardized in the IEEE 802.11. The wireless LAN technology using a 2.4 GHz frequency band through the IEEE 802.11 started with supporting a speed of 1~2 megabits per second (Mbps), applying technologies such as frequency hopping, spread spectrum, and infrared communication. Thereafter, while supporting a speed of up to 54 Mbps, various technologies such as quality for service (QoS) improvement, compatibility with an access point (AP) protocol, security enhancement, radio resource measurement, wireless access vehicle environment, fast roaming, mesh network, interworking with external networks, wireless network management, etc. are being put into practice or being developed.

Among the current IEEE 802.11 standards, the IEEE 802.11a/b/g/n/ac/ad have been commercialized, and the IEEE 802.11b of them supports a communication speed of up to 11 Mbps while using frequency of the 2.4 GHz band.

Since the IEEE 802.11a uses various communication protocols, it uses a 5 GHz band instead of the 2.4 GHz band having severe interferences, and improves the communication speed up to 54 Mbps by applying the OFDM technology. However, according to characteristics of radio waves, radio waves in the 5 GHz band have good straightness, while a diffraction performance is poor. Accordingly, the IEEE 802.11a has a short communication distance compared to the IEEE 802.11b.

The IEEE 802.11g uses the 2.4 GHz band like the IEEE 802.11b. It realizes a communication speed of up to 54 Mbps and shows good performance in terms of backward compatibility with the IEEE 802.11b.

The IEEE 802.11n is a technology developed to overcome the limitation of communication speed known as a weakness of the wireless LAN. It aims to increase the network speed and reliability and extend the operation distance of the wireless network. By applying multiple-inputs and multiple-outputs (MIMO) technology that uses multiple antennas at both ends of a transmitter and a receiver along with the OFDM technology, the IEEE 802.11n supports a high throughput (HT) with a maximum data processing rate of 540 Mbps or more. In addition, a coding scheme for transmitting multiple duplicate copies was also adopted to increase data reliability.

The IEEE 802.11ac was developed to support a higher throughput (i.e., very high throughput (VHT)) than the high throughput (HT) having a maximum data throughput of 540 Mbps or more. Therefore, the IEEE 802.11ac selects the 5 GHz band as a center frequency band, and configures a wide bandwidth (i.e., 80 MHz-160 MHz) to support the high data throughput. Also, the IEEE 802.11ac has backward compatibility with the existing products by supporting not only the 5 GHz band but also the existing 2.4 GHz band. The IEEE 802.11ac theoretically achieves a minimum speed of 1 Gbps as a wireless LAN speed of multiple terminals, and a maximum single link speed of at least 500 Mbps. These speeds are realized by introducing enhanced wireless interface technologies, such as a wider radio frequency bandwidth (up to 160 MHz), more MIMO spatial streams (up to 8), multi-user MIMO, and high-order modulation (up to 256 QAM).

The IEEE 802.11ad can transmit data using a 60 GHz band instead of the existing 2.5 GHz/5 GHz. Since the IEEE 802.11ad uses beamforming technology to support a speed of up to 7 Gbps, it is suitable for a large amount of data or a high bit rate video streaming of an uncompressed HD video. Due to the low diffraction property according to the frequency characteristics, a blockage may occur. Accordingly, a communication coverage of the IEEE 802.11ad may not be large.

The IEEE 802.11ax aims to increase an average transmission rate per user by at least 4 times or more by supporting functions for implementing high-speed wireless technology in a dense environment. To achieve this goal, the multi-User MIMO (MU-MIMO) and OFDMA technology may be utilized. In particular, by expanding the size of the Fast Fourier Transform (FFT) of the OFDM and increasing the density of subcarriers, it has greatly improved the robustness and performance in multi-path fading environments and outdoors.

The IEEE 802.11be is the next generation technology of IEEE 802.11ax, and standardization work is actively underway.

Meanwhile, the prior arts of the present invention have been prepared to enhance understanding of the background of the present invention, and may include contents other than the prior arts already known to ordinary skilled persons in the field to which the present invention belongs.

DISCLOSURE

Technical Problem

An objective of the present invention for solving the above-described problem is to provide a multi-link sharing method and apparatus for reducing a latency in a wireless LAN supporting multi-links.

Technical Solution

An operation method of a first communication node, according to a first exemplary embodiment of the present invention for achieving the objective, may comprise: configuring a transmission period; performing communication with a second communication node using a first link and a second link within the transmission period; sharing the transmission period with a third communication node; and performing communication with the second communication node using the first link within the transmission period, wherein the second link is used for communication of the third communication node within the transmission period.

The performing of communication with the second communication node using the first link and the second link within the transmission period may comprise transmitting a first physical layer convergence protocol (PLCP) protocol data unit (PPDU) to the second communication node using the first link; and transmitting a second PPDU to the second communication node using the second link, wherein the second PPDU includes an indicator permitting sharing of the second link within the transmission period.

A duration field included in the second PPDU may indicate information for estimating a time for which the second link is shared.

The sharing of the transmission period with the third communication node may comprise receiving a trigger frame including sharing request information from the second communication node; and determining whether to share the transmission period based on the sharing request information.

The sharing request information may include one or more of information indicating that sharing of the transmission period is requested, information indicating a communication node sharing the transmission period, information indicating a sharing time, an access category (AC) type of data transmitted in the shared transmission period, and information indicating a shared link among the multi-links.

The communication between the first communication node and the second communication node using the first link may be performed after a preconfigured time from a time when the sharing request information is received, and the preconfigured time may be greater than or equal to a short interframe space (SIFS).

The sharing of the transmission period with the third communication node may further comprise, when the transmission period is determined to be shared with the third communication node, transmitting sharing approval information to the third communication node.

The operation method may further comprise obtaining information indicating that sharing of the transmission period has been terminated from the second communication node; and performing communication with the second communication node using the first link and the second link within the transmission period.

The information indicating that the sharing of the transmission period has been terminated may be included in a multi-station block ACK (multi-STA BA) transmitted from the second communication node.

An operation method of a second communication node, according to a second exemplary embodiment of the present invention for achieving the objective, may comprise receiving a first physical layer convergence protocol (PLCP) protocol data unit (PPDU) from a first communication node on a first link among the multi-links; receiving, from the first communication node, a second PPDU including an indicator permitting sharing of a second link among the multi-links on the second link; transmitting a received response for the first PPDU to the first communication node on the first link; and transmitting a trigger frame including sharing request information to the first communication node and the third communication node on the second link in response to the reception of the second PPDU.

The operation method may further comprise receiving a third PPDU from the first communication node on the first link; receiving a fourth PPDU from the third communication node on the second link; transmitting a reception response for the third PPDU to the first communication node on the first link; and transmitting a reception response for the fourth PPDU on the second link.

The third PPDU and the fourth PPDU may be received after a preconfigured time from a transmission time of the trigger frame, and the preconfigured time may be greater than or equal to a short interframe space (SIFS).

The reception response for the fourth PPDU may include information indicating that sharing of the second link has been terminated, and reception targets of the reception response for the fourth PPDU may be the first communication node and the third communication node.

A duration field included in the second PPDU may indicate information for estimating a sharing time of the second link.

The sharing request information may include one or more of information indicating that sharing of a link is requested, information indicating a communication node sharing a link, information indicating a sharing time, an access category (AC) type of data transmitted on a shared link, and information indicating a shared link among the multi-links.

An operation method of a third communication node, according to a third exemplary embodiment of the present invention for achieving the objective, may comprise receiving, from a second communication node, a trigger frame including sharing request information indicating that a second link among the multi-links is shared on the second link; transmitting a first physical layer convergence protocol (PLCP) protocol data unit (PPDU) to the second communication node on the second link; and receiving a reception response for the first PPDU from the second communication node on the second link, wherein a first link among the multi-links is used by the first communication node.

The first PPDU may be transmitted after a preconfigured time from a reception time of the trigger frame, and the preconfigured time may be greater than or equal to a short interframe space (SIFS).

The reception response for the first PPDU may include information indicating that sharing of the second link has been terminated.

The sharing request information may include one or more of information indicating that sharing of a link is requested, information indicating a communication node sharing a link, information indicating a sharing time, an access category (AC) type of data transmitted on a shared link, and information indicating a shared link among the multi-links.

The operation method may further comprise receiving, from the first communication node, sharing approval information for approving the sharing of the second link, wherein the first PPDU is transmitted when the sharing approval information is received.

Advantageous Effects

According to the present invention, communication nodes (e.g., an access point (AP) and/or a station (STA)) in a wireless LAN supporting multi-links may share a transmission opportunity (TXOP) for multi-links. Therefore, the communication nodes may transmit data without performing a backoff operation in the shared TXOP. Accordingly, the data transmission delay may be reduced. The present invention may be applied to various communication nodes (e.g., AP, STA, management device) supporting the wireless LAN.

MODES OF THE INVENTION

Figure 1:
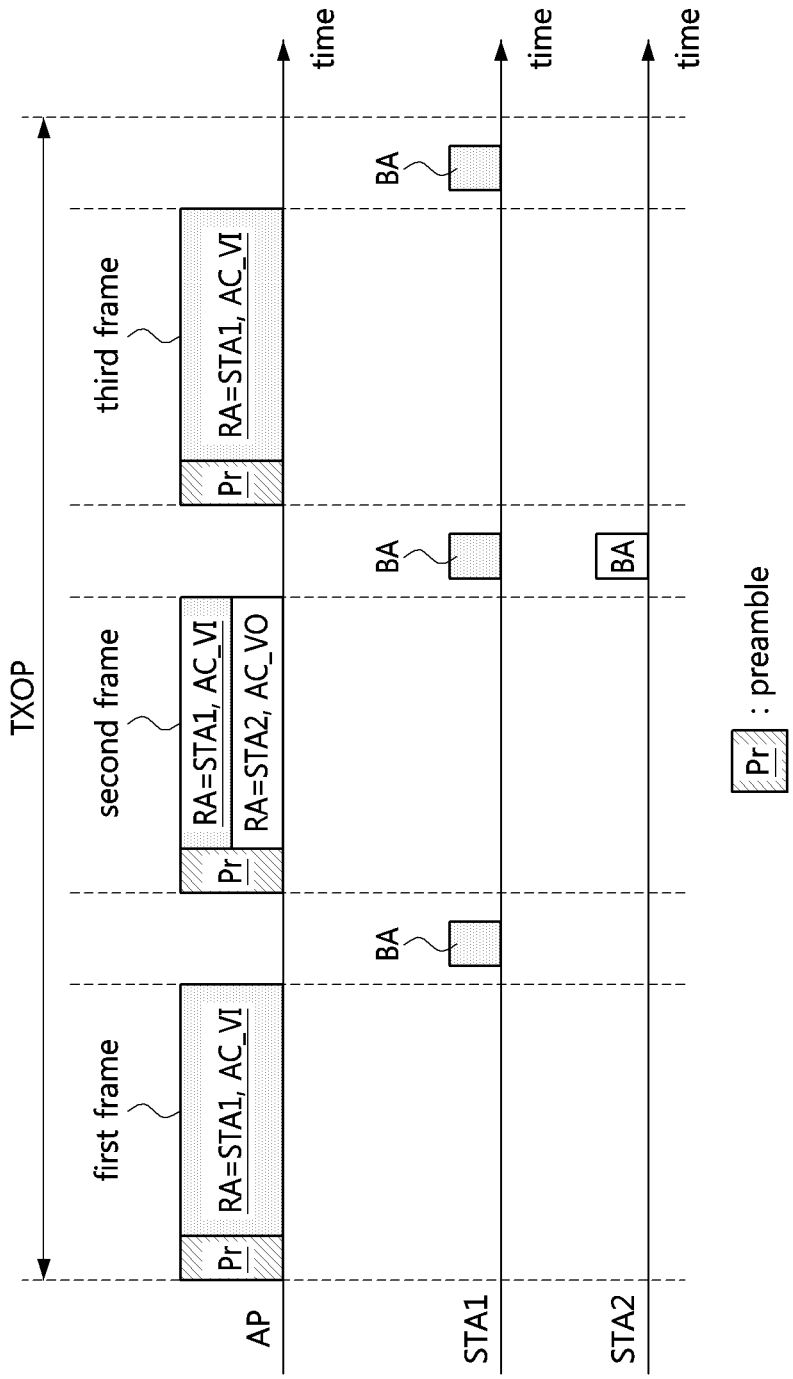
FIG. 1 is a timing diagram illustrating a first exemplary embodiment of a TXOP sharing method.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

In the following, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

Hereinafter, communication methods a shared transmission opportunity (TXOP) will be described. Even when a method (e.g., transmission or reception of a signal) performed by a first communication node among communication nodes is described, a corresponding second communication node may perform a method corresponding to the method performed by the first communication node (e.g., reception or transmission of the signal). That is, when an operation of a station (STA) is described, an access point (AP) corresponding thereto may perform an operation corresponding to the operation of the STA. Conversely, when an operation of an AP is described, a corresponding STA may perform an operation corresponding to the operation of the AP. In addition, exemplary embodiments applied to a STA may be applied also to an AP, and exemplary embodiments applied to an AP may be applied also to a STA. In exemplary embodiments, a STA may be a STA affiliated with a multi-link device (MLD) using multi-links, and an AP may be an AP affiliated with an MLD. Other STAs may be STAs affiliated with other MLDs.

FIG. 1 is a timing diagram illustrating a first exemplary embodiment of a TXOP sharing method.

Referring to FIG. 1, in the institute of electrical and electronics engineers (IEEE) 802.11, a TXOP may be allocated according to an access category (AC). In exemplary embodiments, a TXOP may be referred to as a 'transmission period'. An AC preempting a TXOP may be referred to as a primary AC. In the TXOP, transmission of data according to an AC (hereinafter, referred to as 'other AC data') other than data according to the primary AC (hereinafter, referred to as 'primary AC data') may be prohibited. However, not only the primary AC data but also other AC data may be transmitted within a shared TXOP shown in FIG. 1.

In the exemplary embodiment shown in FIG. 1, a TXOP may be configured by a communication node (e.g., an access point (AP) and/or a station (STA)), and the TXOP may be shared by a plurality of communication nodes. The AP may transmit data to a plurality of STAs (e.g., STA1 and STA2). Here, the data may be simultaneously transmitted to the STA1 and the STA2. The primary AC of the TXOP may be AC_VI (e.g., AC_VI of the STA1). However, when the TXOP is shared, not only the primary AC data but also other AC data (e.g., AC_VO data of the STA2) may be transmitted within the TXOP.

The AP may transmit a first frame to the STA1 within the TXOP. The first frame may include a preamble (Pr) and AC_VI data. A receiver address or recipient address (RA) of the first frame may be set to the STA1. The STA1 may receive the first frame from the AP, and may transmit a response (e.g., acknowledgment (ACK) or block ACK (BA)) for the first frame to the AP.

The AP may transmit a second frame to the STA1 and STA2 within the TXOP. The second frame may include a Pr, AC_VI data, and AC_VO data. An RA of the AC_VI data included in the second frame may be set to the STA1, and an RA of the AC_VO data included in the second frame may be set to the STA2. The STA1 may receive the second frame (e.g., AC_VI data) from the AP, and may transmit a response (e.g., ACK or BA) for the AC_VI data to the AP. The STA2 may receive the second frame (e.g., AC_VO data) from the AP, and may transmit a response (e.g., ACK or BA) for the AC_VO data to the AP.

The AP may transmit a third frame to the STA1 within the TXOP. The third frame may include a Pr and AC_VI data. An RA of the third frame may be set to the STA1. The STA1 may receive the third frame from the AP, and may transmit a response (e.g., ACK or BA) for the third frame to the AP.

The AC_VI data and AC_VO data included in the second frame may be multiplexed in the frequency domain. That is, multi-user (MU) physical layer convergence protocol (PLCP) protocol data units (PPDUs) included in the second frame may be generated in a frequency division multiplexing (FDM) scheme, and a first MU PPDU including the AC_VI data and a second MU PPDU including the AC_VO data may be transmitted. Channels generated in the above-described FDM scheme may mean links. One preamble Pr may be positioned in front of the first MU PPDU and the second MU PPDU. In the exemplary embodiment shown in FIG. 1, three types of MU PPDUs may be transmitted within one TXOP. The STA receiving the MU PPDU may transmit a BA. The BA may be transmitted in a general BA form or an orthogonal frequency division multiple access (OFDMA) BA form according to capability of the communication node. Here, the BA may be transmitted in form of an OFDMA BA requested by a multi user block ack request (MU BAR).

Figure 2:
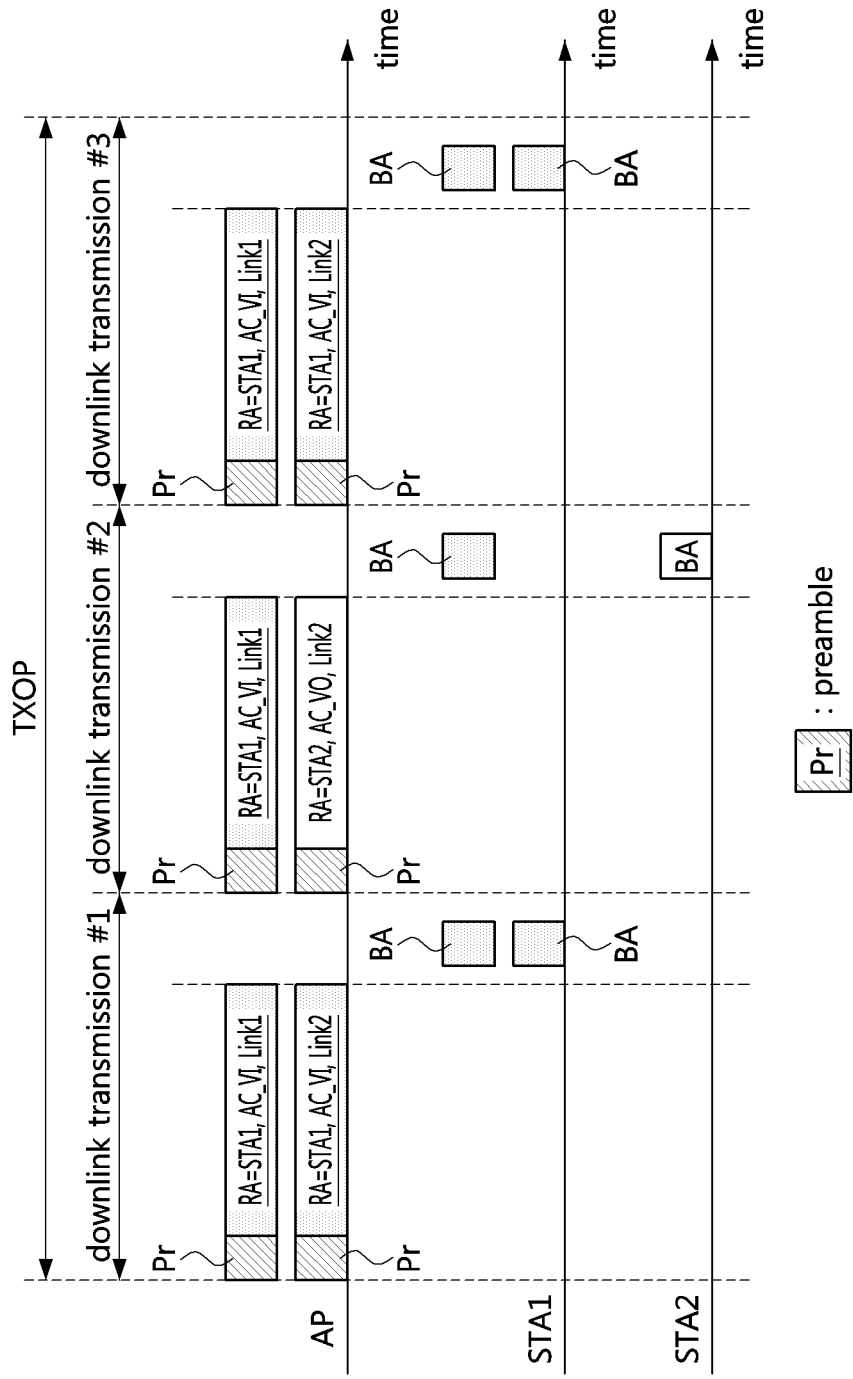
FIG. 2 is a timing diagram illustrating a first exemplary embodiment of a multi-link TXOP sharing method based on a downlink active sharing scheme.

FIG. 2 is a timing diagram illustrating a first exemplary embodiment of a multi-link TXOP sharing method based on a downlink active sharing scheme.

Referring to FIG. 2, the AP may simultaneously transmit data to the STA1 and the STA2 affiliated with different MLDs. An active sharing scheme may mean that a TXOP holder that has acquired a TXOP shares the TXOP in the multi-links. The TXOP holder may be a communication node that transmits data. The TXOP shared for multi-links may be referred to as 'multi-link TXOP'. AC_VI may be set as a primary AC. The AP may transmit a PPDU including primary AC data (e.g., AC_VI data) and a PPDU including other AC data (e.g., AC_VO data) within the multi-link TXOP. An RA of the AC_VI data may be set to the STA1, and an RA of the AC_VO data may be set to the STA2.

A frame transmitted on a link 1 may include a Pr and AC_VI data, and a frame transmitted on a link 2 may include 'Pr and AC_VI data' or 'Pr and AC_VO data'. That is, the preamble may be attached to each PPDU. Frames composed of preambles and data may be transmitted on the link 1 and the link 2.

In the exemplary embodiment shown in FIG. 2, three downlink transmissions (e.g., downlink transmissions #1 to #3) may be performed within one TXOP. In the downlink transmission #2, a TXOP for the AC_VI data of the link 1 may be shared for the AC_VO data of the link 2. The AC_VO data may be transmitted without a separate backoff delay within the TXOP (e.g., multi-link TXOP). A STA (e.g., STA1 and/or STA2) receiving the PPDU may transmit a BA to the AP. Regardless of capability of the communication node, the AP may simultaneously receive BAs from the STAs.

Figure 3:
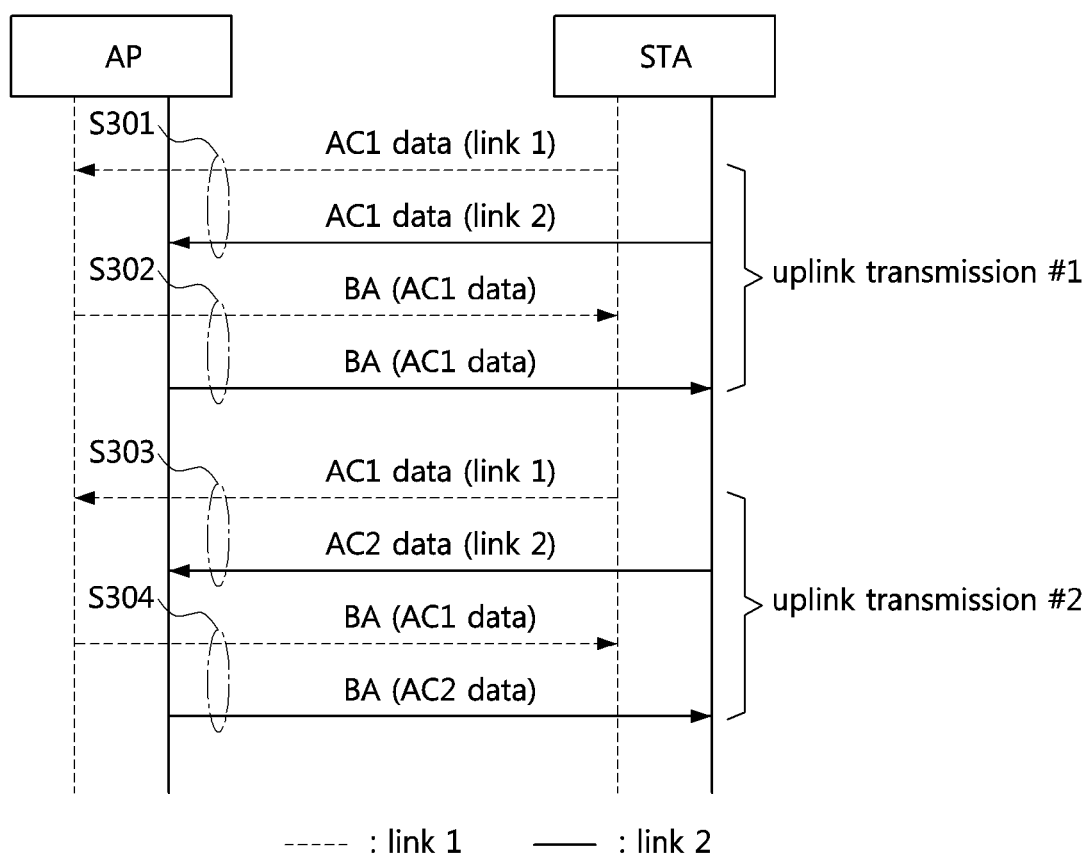
FIG. 3 is a sequence chart illustrating a first exemplary embodiment of a multi-link TXOP sharing method based on an uplink sharing scheme.

FIG. 3 is a sequence chart illustrating a first exemplary embodiment of a multi-link TXOP sharing method based on an uplink sharing scheme.

Referring to FIG. 3, a STA may transmit data to an AP using multi-links. An active sharing scheme may mean that a TXOP holder that has acquired a TXOP shares the corresponding TXOP in multi-links.

In the exemplary embodiment shown in FIG. 3, AC1 may be set as a primary AC. A multi-link TXOP for uplink transmission may be configured by a communication node (e.g., TXOP holder), and a STA may perform uplink transmission within the configured multi-link TXOP (S301). Here, the multi-link TXOP may be configured by the STA. In a period of an uplink transmission #1 (hereinafter referred to as 'uplink transmission period #1'), the STA may transmit AC1 data to an AP using a link 1, and transmit AC1 data to the AP using a link 2. In the link 1 and link 2, the AC1 data may be transmitted simultaneously. The AP may receive the AC1 data from the STA on the multi-links (e.g., link 1 and link 2), and transmit a reception response (e.g., ACK or BA) for the AC1 data to the STA using the multi-links (S302).

When AC data (e.g., data having a different traffic identifier (TID)) exists in a transmission queue of the STA, a TXOP for transmission of the AC1 data of the link 1 may be shared for transmission of AC2 data of the link 2 in a period of an uplink transmission #2 (hereinafter, referred to as 'uplink transmission period #2'). In this case, the STA may transmit the AC1 data to the AP using the link 1 (S303), and may transmit the AC2 data to the AP using the link 2 (S303). Therefore, within the multi-link TXOP, the AC2 data may be transmitted without a separate backoff delay. Here, the AC2 data may be data more sensitive to a transmission delay than the AC1 data. Upon receiving the data, the AP may transmit a BA for the data (e.g., block data) to the STA (S304). The STA may receive the BA for the data from the AP.

Figure 4:
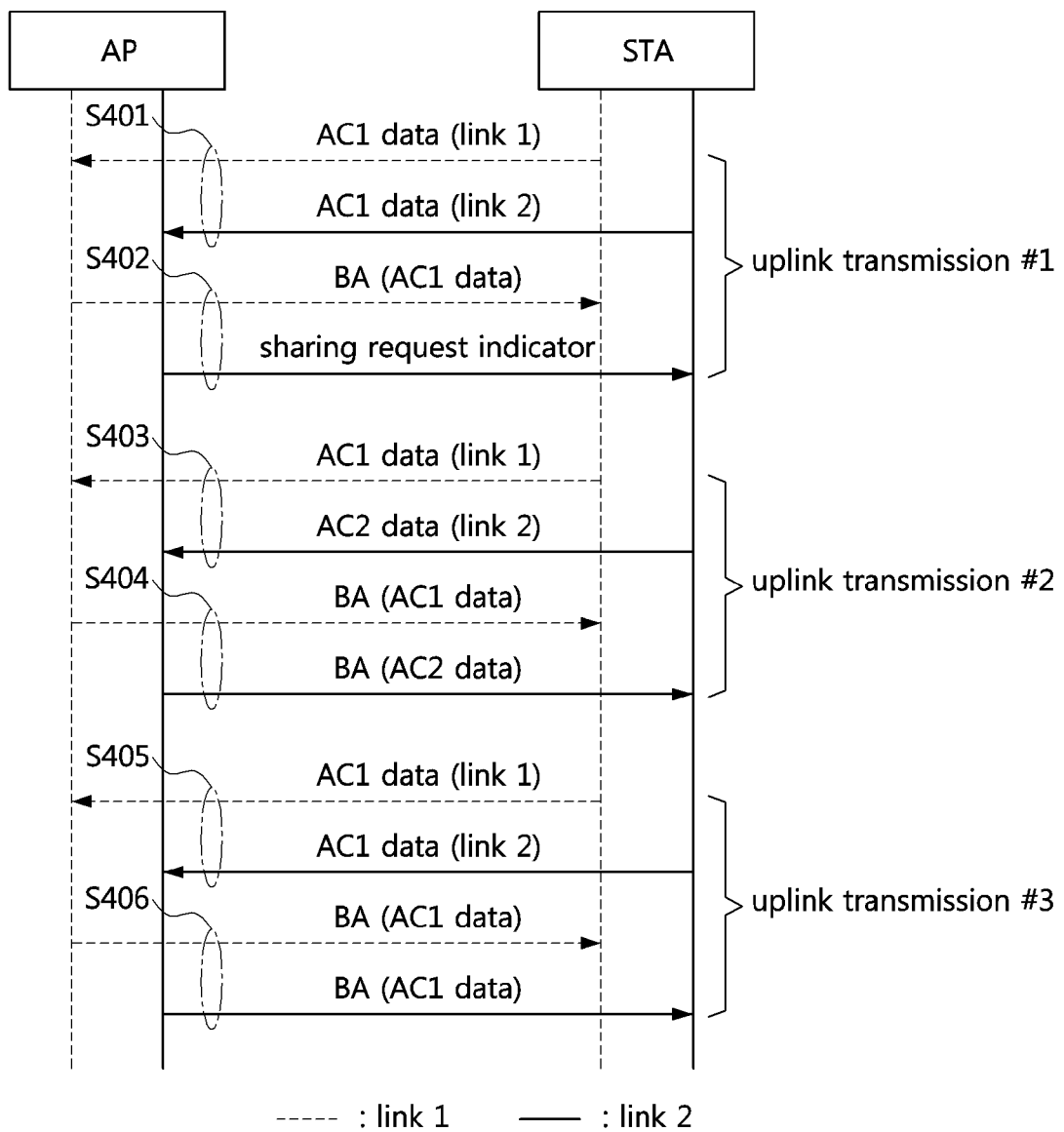
FIG. 4 is a sequence chart illustrating a first exemplary embodiment of a multi-link TXOP sharing method based on an uplink passive sharing scheme.

FIG. 4 is a sequence chart illustrating a first exemplary embodiment of a multi-link TXOP sharing method based on an uplink passive sharing scheme.

Referring to FIG. 4, a STA may simultaneously transmit data to an AP using multi-links. A passive sharing scheme may mean that a communication node that receives data, which is not a TXOP holder that has acquired a TXOP, requests to share a TXOP for multi-links.

In the exemplary embodiment shown in FIG. 4, AC1 may be set as a primary AC. A STA (e.g., TXOP holder) may configure a multi-link TXOP. That is, the multi-link TXOP configured by the STA may be allocated to an AP. Here, the multi-link TXOP may be configured for transmission of AC1 data. The STA may transmit data to the AP within the multi-link TXOP. In an uplink transmission period #1, the STA may transmit the AC1 data to the AP using both a link 1 and a link 2 (S401). The AP may receive the AC data from the STA through the link 1 and link 2. When sharing of the multi-link TXOP is required, the AP may transmit a sharing request indicator to the STA.

For example, the AP may transmit a BA for the AC1 data to the STA through the link 1 (S402), and may transmit the sharing request indicator to the STA through the link 2 (S402). The sharing request indicator may be included in a preconfigured frame (e.g., action frame or trigger frame), and the preconfigured frame may be transmitted in the step S402. The BA transmitted through the link 1 in the step S402 may be a BA for the AC1 data received through the link 1 in the step S401 or a BA for the AC1 data received through the link 1 and the AC1 data received through the link 2 in the step S401.

The sharing request indicator may be used to request sharing of the multi-link TXOP. In addition, the sharing request indicator may act a role of coordinating a data transmission time when sharing the multi-link TXOP. Here, the sharing request indicator may request to share the multi-link TXOP configured for transmission of the AC1 data for transmission of the AC2 data. In this case, a transmission time of the AC2 data (e.g., length of the AC2 data) may be set to be equal to a transmission time of the AC1 data (e.g., length of the AC1 data). To support this operation, padding may be added to a PPDU including the AC1 data and a PPDU including the AC2 data.

The STA may receive the BA for the AC1 data through the link 1 and may receive the sharing request indicator through the link 2 (S402). When the sharing request indicator is received from the AP, the STA may determine that sharing of the multi-link TXOP is requested for transmission of the AC2 data. In this case, the STA may start transmission after an interframe space (xIFS) from the time when the sharing request indicator is received (e.g., reception starting point or reception ending point). The xIFS may be greater than or equal to a short interframe space (SIFS). For example, the STA receiving the sharing request indicator may transmit the AC1 data to the AP on the link 1 (S403), and may transmit the AC2 data to the AP on the link 2 (S403). The step S403 may be performed after the xIFS from the completion point of the step S402. The AP may receive the AC1 data on the link 1 (S403), and may receive the AC2 data on the link 2 (S403). In this case, the AP may transmit a BA for the AC1 data to the STA on the link 1 (S404), and may transmit a BA for the AC2 data on the link 2 (S404). The BA for the AC2 data may be a multi-STA BA. The multi-STA BA may indicate that transmission of the AC2 data has been terminated. The multi-STA BA may be transmitted to one or more communication nodes.

The STA may receive the BA for the AC1 data from the AP on the link 1 (S404), and may receive the BA for the AC2 data from the AP on the link 2 (S404). When the BA for the AC2 data is a multi-STA BA, the STA may determine that sharing of the multi-link TXOP for transmission of the AC2 data has been terminated. Therefore, the STA may transmit AC1 data to the AP using both the link 1 and the link 2 in a period of an uplink transmission #3 (hereinafter referred to as 'uplink transmission period #3') (S405), and receive BAs for the AC1 data from the AP on the link 1 and the link 2 (S406).

Figure 5:
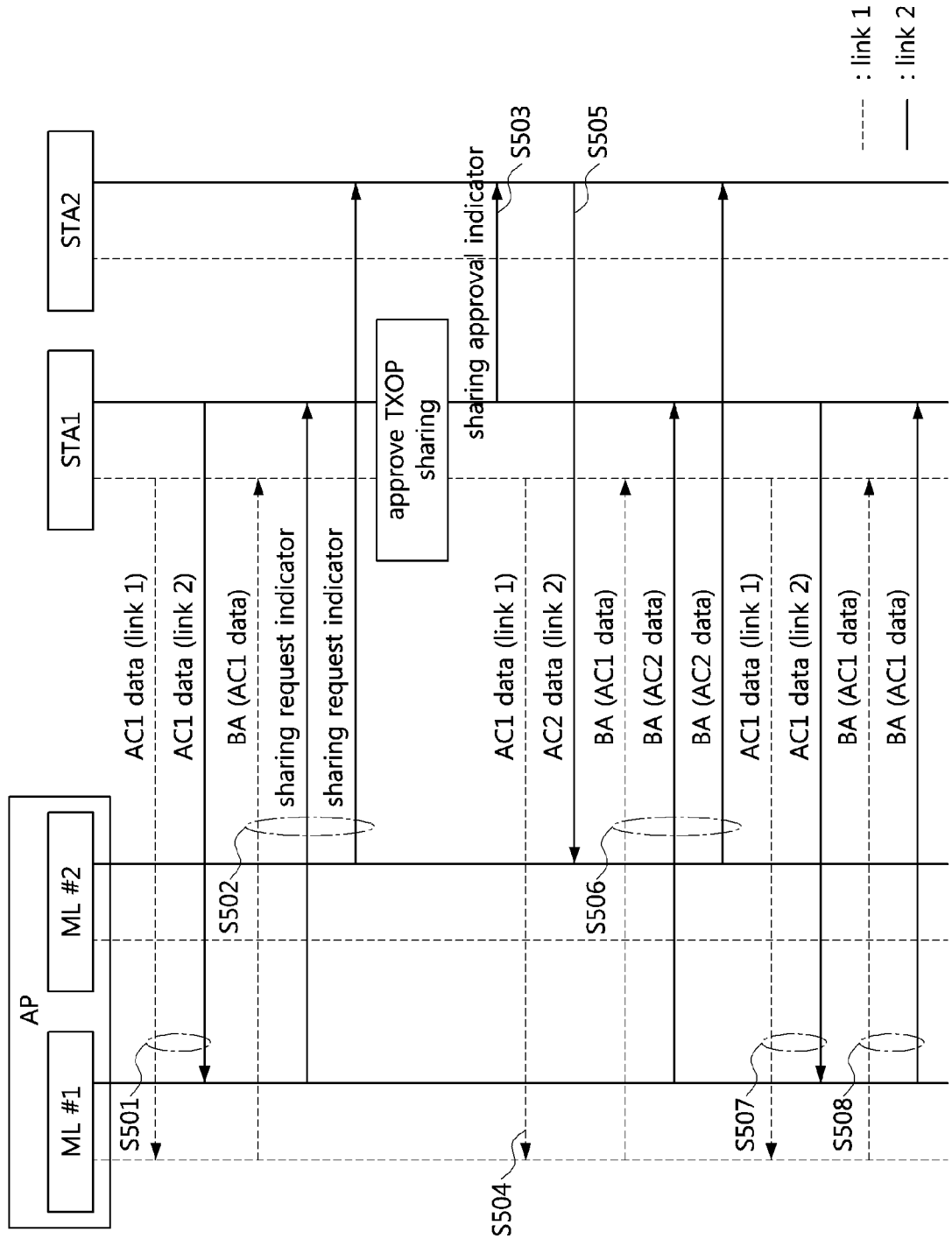
FIG. 5 is a sequence chart illustrating a second exemplary embodiment of a multi-link TXOP sharing method based on an uplink passive sharing scheme.

FIG. 5 is a sequence chart illustrating a second exemplary embodiment of a multi-link TXOP sharing method based on an uplink passive sharing scheme.

Referring to FIG. 5, a communication system may include an AP, STA1, and STA2, and the AP, STA1, and STA2 may support a multi-link operation. In the AP, a multi-link (ML) #1 may be multi-links for the STA1, and in the AP, an ML #2 may be multi-links for the STA2. For example, each of the AP, STA1, and STA2 may transmit and receive frames using multi-links (e.g., link 1 and link 2). A passive sharing method may mean that a communication node that receives data, which is not a TXOP holder that has acquired a TXOP, requests to share the TXOP for multi-links.

AC1 may be set as a primary AC, and a multi-link TXOP for the primary AC may be configured. For example, the STA1 may configure a multi-link TXOP, and the multi-link TXOP may be allocated to other communication nodes (e.g., AP and/or STA2). The STA1 may transmit AC1 data (e.g., frame including the AC1 data) to the AP using both the link 1 and the link 2 (S501). Here, the frame including the AC1 data may include information indicating the size and/or transmission time of the remaining AC1 data. The AP may receive the AC1 data from the STA1 through the link 1 and the link 2 (S501). When sharing of the multi-link TXOP (e.g., multi-link TXOP configured for transmission of the AC1 data) is required for transmission of AC2 data, the AP may transmit a sharing request indicator to the STAs (e.g., STA1 and/or STA2). For example, the AP may transmit a reception response for the AC1 data to the STA1 on the link 1 (S502), and transmit the sharing request indicator to the STA1 and/or STA2 on the link 2 (S502). In the exemplary embodiments, the reception response may indicate ACK or BA The sharing request indicator may be transmitted in form of an action frame or a trigger frame. When the sharing request indicator is included in a trigger frame, reserved bit(s) included in a trigger type subfield of a common information field of the trigger frame may indicate that the corresponding trigger frame includes the sharing request indicator. A specific AC and/or a specific TID may be set in a trigger dependent user information subfield of a user information list field. The specific AC may indicate a sharing target AC. For example, the specific AC may indicate AC2. The specific TID may indicate sharing target data. For example, the specific TID may indicate AC2 data. In addition, the trigger frame may further include information indicating a sharing target link. For example, the trigger frame may indicate that the link 2 is shared.

The STA1 may receive a reception response for the AC1 data from the AP on the link 1 (S502), and may receive the sharing request indicator from the AP on the link 2 (S502). The STA2 may receive the sharing request indicator from the AP on the link 2 (S502). When the sharing request indicator is received from the AP, the STA1, which is the TXOP holder, may determine whether to share the multi-link TXOP. The STA1 may determine that the multi-link TXOP is shared for transmission of the AC2 data (e.g., the sharing target AC or the sharing target data indicated by the sharing request indicator). In this case, the STA1 may transmit the sharing approval indicator to the STA2 (S503). The sharing approval indicator may be transmitted on the link 2. The sharing approval indicator may indicate that the multi-link TXOP is shared for transmission of the AC2 data. The sharing approval indicator may be transmitted in form of an action frame or a trigger frame. For example, the sharing approval indicator may be configured to be the same as or similar to the sharing request indicator.

The STA2 may receive the sharing approval indicator from the STA1 on the link 2 (S503). The STA2 may determine that the multi-link TXOP is shared for transmission of the AC2 data based on the received sharing approval indicator. In another exemplary embodiment, the step S503 may be omitted. In this case, when the sharing request indicator is received from the AP in the step S502, the STA1 and STA2 may determine that the multi-link TXOP (e.g., link 2 in the multi-link TXOP) is shared for transmission of the AC2 data. That is, the operation of the STA1 for determining whether to share the multi-link TXOP may not be performed.

When the multi-link TXOP is shared for transmission of the AC1 data and the AC2 data, the STA1 may transmit the AC1 data to the AP on the link 1 (S504), and the STA2 may transmit the AC2 data to the AP on the link 2 (S505). In the step S504, the AC1 data may be transmitted after an xIFS from the time when the sharing request indicator is received (e.g., reception starting time or reception ending time). The xIFS may be greater than or equal to an SIFS. In the step S505, the STA2 may perform a channel sensing operation during the xIFS from the time when the sharing request indicator is received (e.g., reception starting time or reception ending time), and when a result of the channel sensing operation is determined to be an idle state, the STA2 may transmit the AC2 data to the AP. That is, when the result of the channel sensing operation is determined to be the idle state, the STA2 may determine that sharing of the multi-link TXOP for transmission of the AC2 data is approved.

In this case, the multi-link TXOP may be shared during a time (hereinafter, referred to as 'sharing time') coordinated by the sharing request indicator. Padding may be added to a PPDU having a shorter length among a PPDU including the AC1 data and a PPDU including the AC2 data in order to match the sharing time (e.g., transmission time of the AC1 data and transmission time of the AC2 data). According to this operation, the length of the PPDU including the AC1 data may be set to be equal to the length of the PPDU including the AC2 data. Alternatively, the length of the PPDU including the AC2 data may be set to be equal to the length of the PPDU including the AC1 data.

Meanwhile, the AP may receive the AC1 data from the STA1 on the link 1 (S504) and the AC2 data from the STA2 on the link 2 (S505). The AP may transmit a reception response for the AC1 data to the STA1 on the link 1 (S506). When the sharing of the multi-link TXOP for transmission of the AC2 data is terminated, the AP may transmit a reception response for the AC2 data to not only the STA2 but also the STA1 on the link 2 (S506).

Here, the reception response for the AC2 data may be a multi-STA BA. The multi-STA BA may indicate that sharing of the multi-link TXOP (e.g., sharing target link) has been terminated. In the format of the multi-STA BA, reserved bit(s) of a combination of ACK type subfield values and TID subfield values of a per-AID TID information field may indicate that the sharing of the multi-link TXOP has been terminated. When the above-described scheme is used, the AP may not transmit a start sequence number and/or a BA bitmap to the STA1.

The STA1 may receive the reception response for the AC1 data from the AP on the link 1 (S506), and may receive the reception response for the AC2 data from the AP on the link 2 (S506). The STA1 may determine that sharing of the multi-link TXOP (e.g., link 2) has been terminated based on the reception response for the AC2 data. The STA2 may receive the reception response for the AC2 data from the AP on the link 2 (S506). The STA2 may recognize the reception response for the AC2 data as a general reception response (e.g., general BA). Alternatively, when the reception response for the AC2 data is received from the AP, the STA2 may determine that sharing of the multi-link TXOP has been terminated. Accordingly, the STA2 may stop the transmission operation of the AC2 data.

When sharing of the multi-link TXOP is terminated, the STA1 may transmit the AC1 data to the AP using both the link 1 and the link 2 (S507). The AP may receive the AC1 data from the STA1 on the link 1 and the link 2 (S507). The AP may transmit a reception response for the AC1 data to the STA1 by using both the link 1 and the link 2 (S508). The STA1 may receive the reception response for the AC1 data from the AP on the link 1 and the link 2 (S508).

Figure 6:
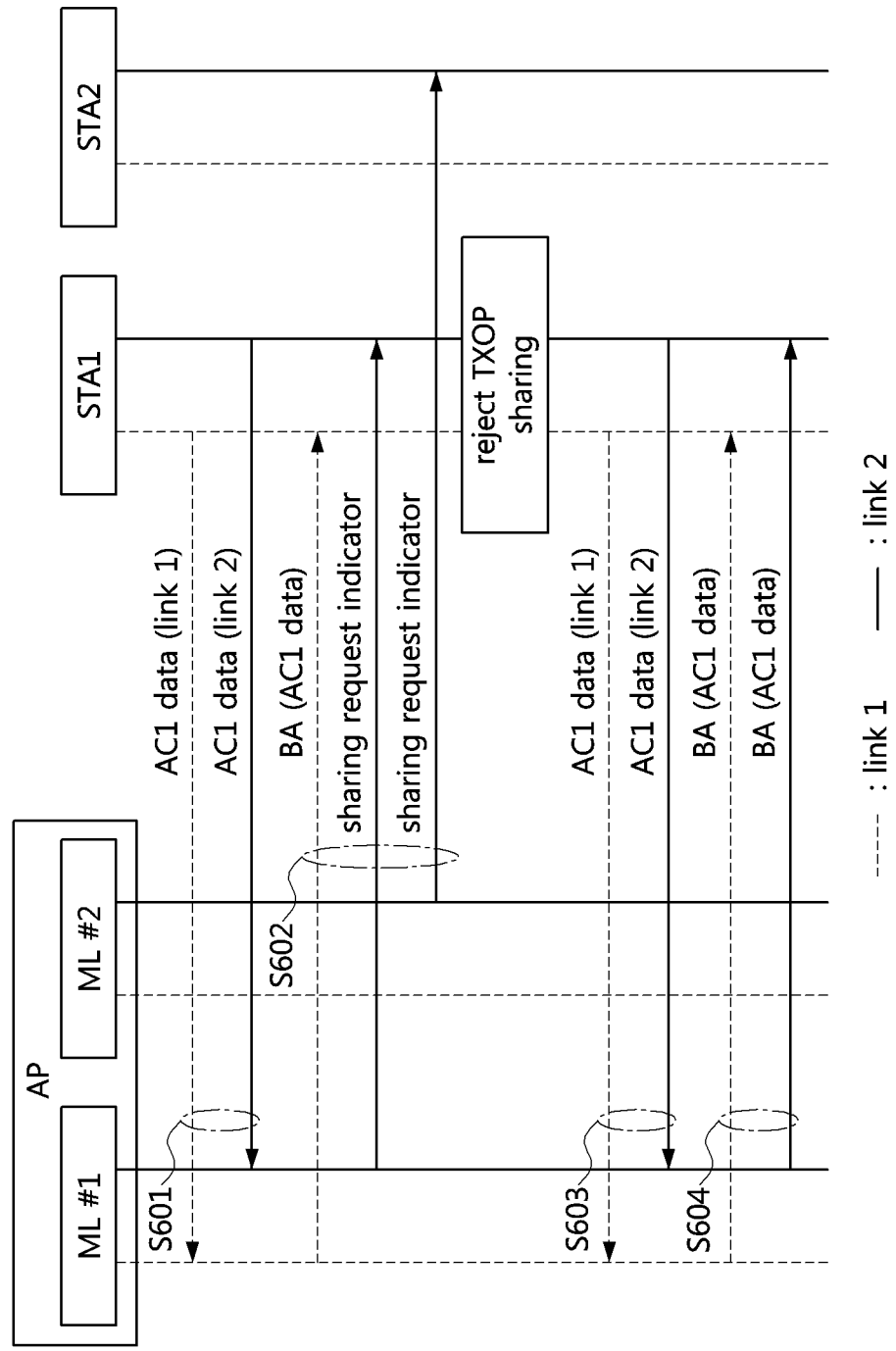
FIG. 6 is a sequence chart illustrating a third exemplary embodiment of a multilink TXOP sharing method based on an uplink passive sharing scheme.

FIG. 6 is a sequence chart illustrating a third exemplary embodiment of a multilink TXOP sharing method based on an uplink passive sharing scheme.

Referring to FIG. 6, a communication system may include an AP, STA1, and STA2, and the AP, STA1, and STA2 may support a multi-link operation. In the AP, an ML #1 may be multi-links for the STA1, and in the AP, an ML #2 may be multi-links for the STA2. For example, each of the AP, STA1, and STA2 may transmit and receive frames using multi-links (e.g., link 1 and link 2). A passive sharing scheme may mean that a communication node that receives data, which is not a TXOP holder that has acquired a TXOP, requests to share the TXOP for multi-links.

In the exemplary embodiment shown in FIG. 6, a sharing request of the multi-link TXOP based on the uplink passive sharing scheme may be attempted by different communication nodes. The TXOP holder (e.g., STA1) may reject the sharing request of the multi-link TXOP. AC1 may be set as a primary AC, and a multi-link TXOP for the primary AC may be configured. For example, the STA1 may configure a multi-link TXOP, and the multi-link TXOP may be allocated to other communication nodes (e.g., AP and/or STA2).

The STA1 may transmit AC1 data (e.g., frame including the AC1 data) to the AP using both a link 1 and a link 2 (S601). The AP may receive the AC1 data from the STA1 on the link 1 and the link 2 (S601). When sharing of a multi-link TXOP (e.g., multi-link TXOP configured for transmission of the AC1 data) is required for transmission of AC2 data, the AP may transmit a sharing request indicator to the STAs (e.g., STA1 and/or STA2). For example, the AP may transmit a reception response (e.g., ACK or BA) for the AC1 data to the STA1 on the link 1 (S602), and transmit the sharing request indicator to the STA1 and/or STA2 on the link 2 (S602). The sharing request indicator may request sharing of a multi-link TXOP (e.g., link 2) for transmission of the AC2 data.

The STA1 may receive the reception response for the AC1 data from the AP on the link 1 (S602), and may receive the sharing request indicator from the AP on the link 2 (S602). The STA2 may receive the sharing request indicator from the AP on the link 2 (S602). When the sharing request indicator is received from the AP, the STA1, which is the TXOP holder, may determine whether to share the multi-link TXOP. The STA1 may reject the sharing request of the multi-link TXOP for transmission of the AC2 data (e.g., sharing target AC or sharing target data indicated by the sharing request indicator). In this case, the STA1 may notify that the sharing request of the multi-link TXOP has been rejected using an explicit method and/or an implicit method.

When the explicit method is used, the STA1 may transmit a sharing rejection indicator to the AP and/or the STA2. The sharing rejection indicator may indicate that the sharing request of the multi-link TXOP is rejected. The sharing rejection indicator may be included in an action frame or a trigger frame. When the sharing rejection indicator is received from the STA1, the AP and the STA2 may determine that sharing of the multi-link TXOP for transmission of the AC2 data has been rejected. Therefore, the STA2 may not transmit the AC2 data on the link 2.

When the implicit method is used, the STA1 may transmit the AC1 data to the AP using the link 1 and the link 2 after an SIFS from the time when the share request indicator is received (e.g., reception starting time or reception ending time) (S603). Upon receiving the share request indicator, the STA2 may perform a channel sensing operation during an xIFS from the time when the sharing request indicator is received (e.g., reception starting time or reception ending time). The xIFS may be greater than or equal to an SIFS. Since the AC1 data is transmitted after the SIFS from the time when the sharing request indicator is received, a result of the channel sensing operation performed by the STA2 may be determined to be a busy state. In this case, the STA2 may determine that the request for sharing the multi-link TXOP for transmission of the AC2 data has been rejected, and may not transmit the AC2 data on the link 2.

Meanwhile, the AP may receive the AC1 data from the STA1 on the link 1 and the link 2 (S603). Since the AC1 data is received instead of the AC2 data, the AP may determine that the request for sharing the multi-link TXOP for transmission of the AC2 data has been rejected. The AP may transmit a reception response for the AC1 data to the STA1 on the link 1 and the link 2 (S604). The STA1 may receive the reception response for the AC1 data from the AP on the link 1 and the link 2 (S604).

Figure 7:
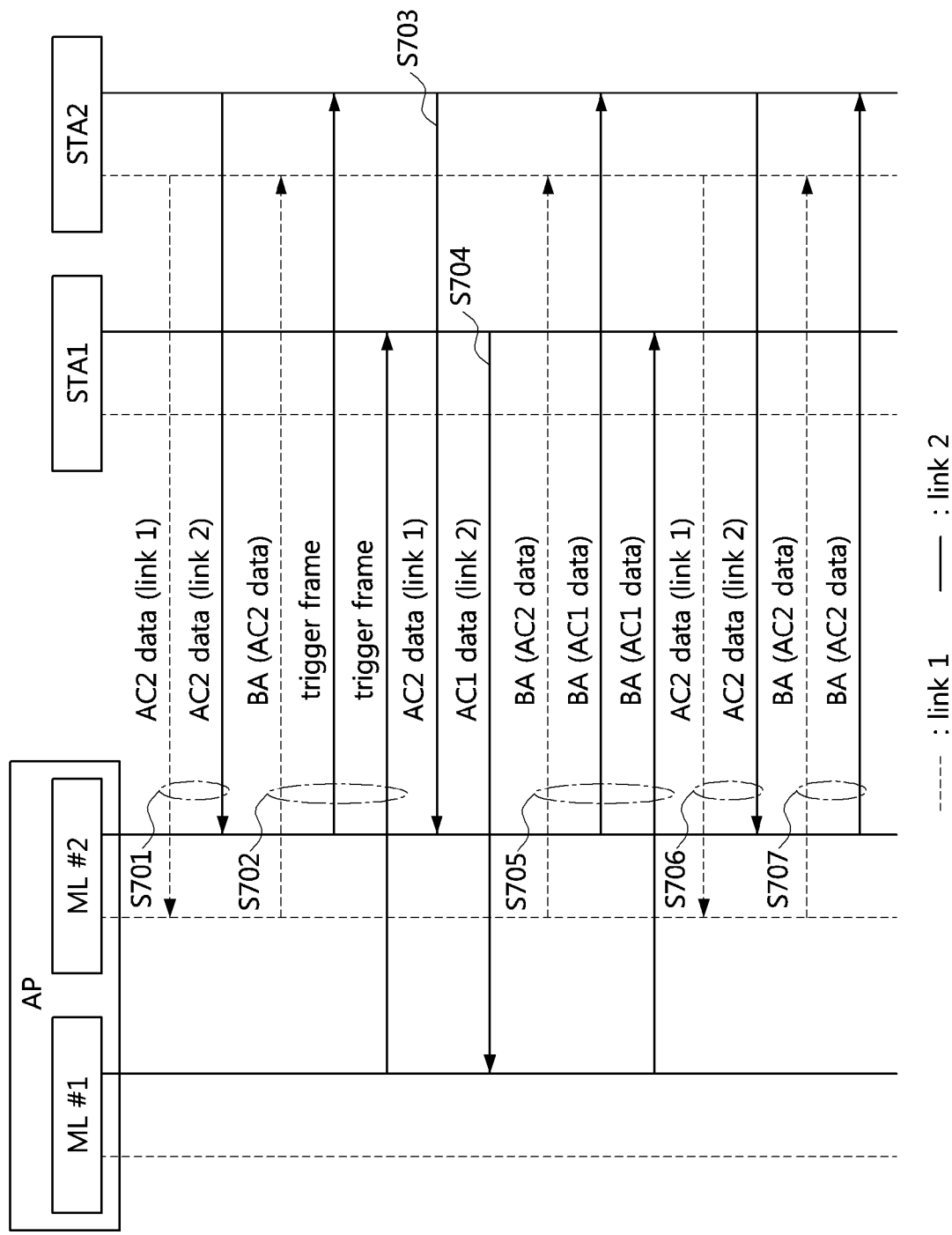
FIG. 7 is a sequence chart illustrating a fourth exemplary embodiment of a multi-link TXOP sharing method based on an uplink passive sharing scheme.

FIG. 7 is a sequence chart illustrating a fourth exemplary embodiment of a multi-link TXOP sharing method based on an uplink passive sharing scheme.

Referring to FIG. 7, a communication system may include an AP, STA1, and STA2, and the AP, STA1, and STA2 may support a multi-link operation. In the AP, an ML #1 may be multi-links for the STA1, and in the AP, an ML #2 may be multi-links for the STA2. For example, each of the AP, STA1, and STA2 may transmit and receive frames using multi-links (e.g., link 1 and link 2). The passive sharing scheme may mean that a communication node that receives data, which is not a TXOP holder that has acquired a TXOP, requests to share the TXOP for multi-links.

In the exemplary embodiment shown in FIG. 7, a sharing request of a multilink TXOP based on the uplink passive sharing scheme may be attempted by different communication nodes. A reward may be provided to a communication node that allows sharing of the multi-link TXOP. For example, as the reward for the sharing of the multi-link TXOP, the communication node may operate in a force sharing mode.

The exemplary embodiment shown in FIG. 7 may be performed after the exemplary embodiment shown in FIG. 5. In the exemplary embodiment shown in FIG. 5, the STA1 has approved the sharing request of the multi-link TXOP for transmission of the AC2 data. In order to provide a reward to the STA1 that has approved the sharing request of the multi-link TXOP, a concept of 'credit' may be introduced. For example, the STA1 that has approved the sharing request of the multi-link TXOP may obtain a credit, and the credit may be managed by the AP and/or another communication node (e.g., each STA).

After the exemplary embodiment shown in FIG. 5 is terminated, AC2 may be set as a primary AC, and a multilink TXOP for the primary AC may be configured. For example, the STA2 may configure a multi-link TXOP, and the corresponding multi-link TXOP may be allocated to other communication nodes (e.g., AP and/or STA1). The STA2 may transmit AC2 data (e.g., frame including the AC2 data) to the AP using both the link 1 and the link 2 (S701). When sharing of the multi-link TXOP (e.g., multi-link TXOP configured for transmission of the AC2 data) is required for transmission of the AC1 data, the AP may transmit a trigger frame to trigger execution of a force sharing mode instead of a sharing request indicator to the STAs (e.g., STA1 and/or STA2). That is, because the STA1 to transmit the AC1 data has a credit, the AP may transmit the trigger frame instead of the sharing request indicator.

The trigger frame may be a trigger frame specified in the IEEE 802.11ax specification. The trigger frame may indicate sharing of the multi-link TXOP. In addition, the trigger frame may include one or more of information indicating a multi-link TXOP as a sharing target, information indicating an AC as a sharing target, and information indicating a link as a sharing target. A communication node (e.g., STA2) receiving the trigger frame triggering execution of the force sharing mode may not be able to reject the sharing request of the multi-link TXOP. For example, the AP may transmit a reception response (e.g., ACK or BA) for the AC2 data to the STA2 on the link 1 (S702), and may transmit the trigger frame triggering execution of the force sharing mode to the STA1 and/or the STA2 on the link 2 (S702).

The STA2 may receive the reception response for the AC2 data from the AP on the link 1 (S702), and may receive the trigger frame from the AP on the link 2 (S702). The STA1 may receive the trigger frame from the AP on the link 2 (S702). When the trigger frame triggering execution of the force sharing mode is received, the STA2, which is the TXOP holder, may not be able to reject the sharing request of the multi-link TXOP according to the trigger frame. Accordingly, the STA2 may share the multi-link TXOP with the STA1.

When the multi-link TXOP is shared for transmission of the AC1 data and the AC2 data, the STA2 may transmit the AC2 data to the AP on the link 1 (S703), and the STA1 may transmit the AC1 data to the AP on the link 2 (S704). The multi-link TXOP may be shared during a time coordinated by the trigger frame (hereinafter, referred to as 'sharing time'). Padding may be added to a PPDU having a short length among a PPDU including the AC1 data and a PPDU including the AC2 data in order to match the sharing time (e.g., transmission time of the AC1 data and transmission time of the AC2 data). According to this operation, the length of the PPDU including the AC1 data may be set to be equal to the length of the PPDU including the AC2 data. Alternatively, the length of the PPDU including the AC2 data may be set to be equal to the length of the PPDU including the AC1 data.

Meanwhile, the AP may receive the AC2 data from the STA2 on the link 1 (S703) and the AC1 data from the STA1 on the link 2 (S704). The AP may transmit a reception response for the AC2 data to the STA1 on the link 1 (S705). When sharing of the multi-link TXOP for transmission of the AC1 data is terminated, the AP may transmit a reception response for the AC1 data to not only the STA1 but also the STA2 on the link 2 (S705).

Here, the reception response for the AC1 data may be a multi-STA BA. The multi-STA BA may indicate that sharing of the multi-link TXOP (e.g., sharing target link) has been terminated. The STA2 may receive the reception response for the AC2 data from the AP on the link 1 (S705), and may receive the reception response for the AC1 data from the AP on the link 2 (S705). The STA2 may determine that sharing of the multi-link TXOP (e.g., link 2) has been terminated based on the reception response for the AC2 data.

The STA1 may receive the reception response for the AC1 data from the AP on the link 2 (S705). The STA1 may recognize the reception response for the AC1 data as a general reception response (e.g., general BA). Alternatively, when the reception response for the AC1 data is received from the AP, the STA1 may determine that sharing of the multi-link TXOP has been terminated. Accordingly, the STA1 may stop transmission of the AC1 data. When the step S705 is completed, the force sharing mode may be terminated. In this case, the communication nodes (e.g., AP, STA1, STA2) may delete the credit of the STA1.

When sharing of the multi-link TXOP is terminated, the STA2 may transmit the AC2 data to the AP using both the link 1 and the link 2 (S706). The AP may receive the AC2 data from the STA2 on the link 1 and the link 2 (S706). The AP may transmit a reception response for the AC2 data to the STA2 using both the link 1 and the link 2 (S707). The STA2 may receive the reception response for the AC2 data from the AP on the link 1 and the link 2 (S707).

Figure 8:
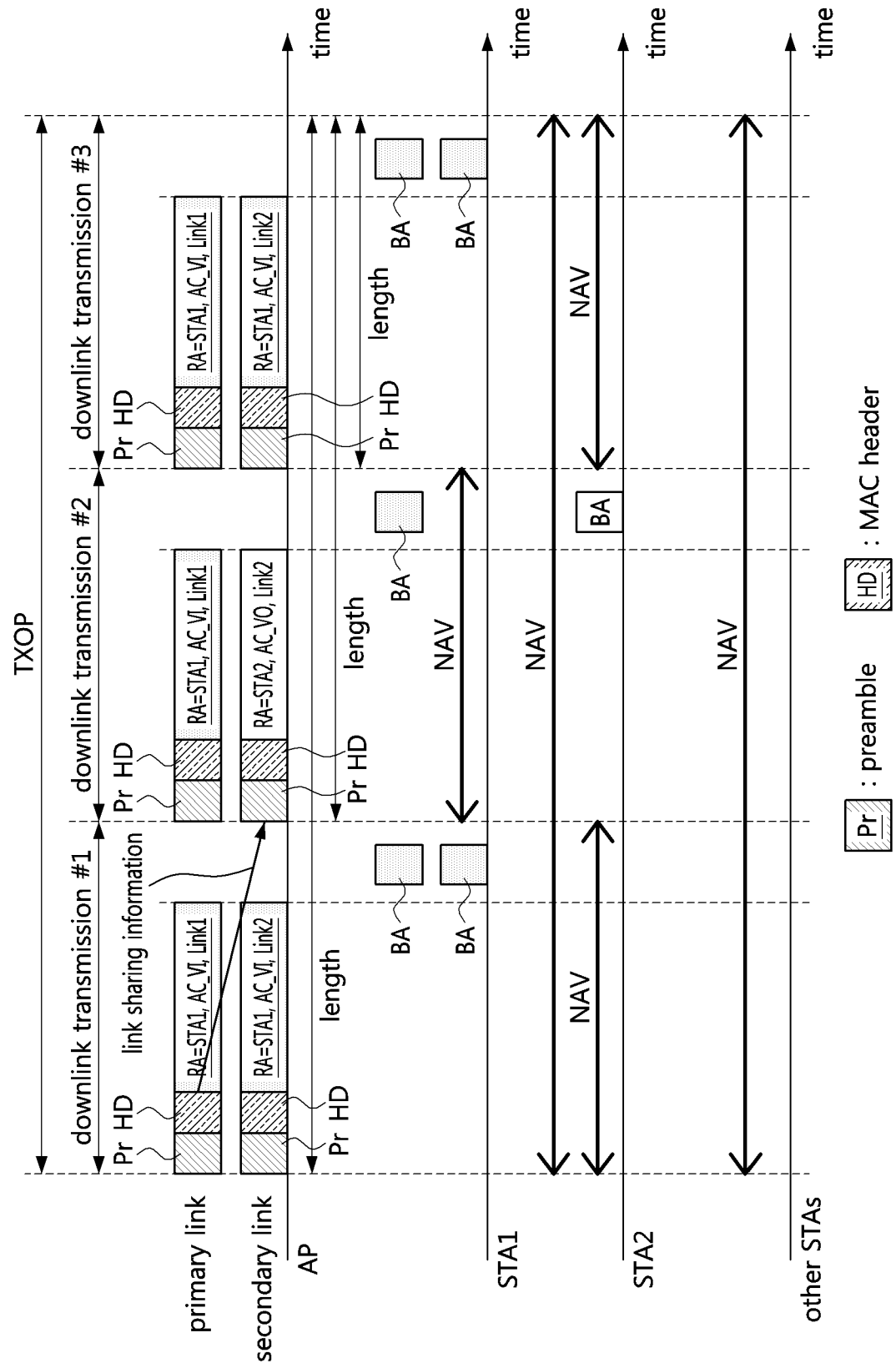
FIG. 8 is a timing diagram illustrating a first exemplary embodiment of a method for releasing a network allocation vector in a multi-link TXOP.

FIG. 8 is a timing diagram illustrating a first exemplary embodiment of a method for releasing a network allocation vector in a multi-link TXOP.

Referring to FIG. 8, a communication system may include an AP, STA1, STA2, and other STAs, and the AP, STA1, STA2, and other STAs may support a multi-link operation. For example, each of the AP, STA1, STA2, and other STAs may transmit and receive frames using multi-links (e.g., link 1 and link 2).

In the exemplary embodiment shown in FIG. 8, a NAV of a STA sharing a TXOP (e.g., multi-link TXOP) may be released. The AP may acquire a TXOP, and may share the TXOP with STAs (e.g., STA1, STA2, and other STAs). That is, the AP may be a TXOP holder. The AP may transmit data to the STA1 using multi-links within the TXOP. For example, the AP may perform downlink transmissions #1 to #3 within the TXOP. The AP may share the TXOP with the STA2 by using one link among multi-links in a downlink transmission period #2. When the TXOP is configured, STAs (e.g., STA2 and other STAs) other than the STA1 performing communication with the AP may set a NAV to be the length of the TXOP. Therefore, the STA2 may not be able to receive the data from shared resources. In order to solve the above-described problem, downlink transmission may be performed as follows.

The AP, which is the TXOP holder, may set a link through which primary AC data is transmitted as a primary link, and set a link shared with the STA2 as a secondary link. The primary link may be a link 1, and the secondary link may be a link 2. The AP may perform the downlink transmission #1 within the TXOP. A preamble and/or a MAC header included in a PPDU transmitted through the primary link in a downlink transmission period #1 may include one or more of information indicating that the secondary link is shared, information indicating a STA sharing the secondary link, and information indicating a sharing time for which the secondary link is shared.

For example, a combination of reserved bit(s) of a type field and a sub-type fields of a frame control field included in the MAC header may indicate one of more of the information indicating that the secondary link is shared, information indicating the STA sharing the secondary link, and information indicating the sharing time for which the secondary link is shared. An unused address field among four address fields may indicate one or more of the information indicating that the secondary link is shared, information indicating the STA sharing the secondary link, and information indicating the sharing time for which the secondary link is shared. For example, in an address field having a size of 48 bits, 32 bits may indicate the STA sharing the secondary link, and the remaining 16 bits may indicate the sharing time for which the secondary link is shared.

The STA2 may receive a PPDU on the primary link in the downlink transmission period #1, may identify, from the PPDU, one or more of the information indicating that the secondary link is shared, information indicating the STA sharing the secondary link, and information indicating the sharing time for which the secondary link is shared. When the STA sharing the secondary link is the STA2, and the sharing time for which the secondary link is shared is the downlink transmission period #2, the STA2 may release the NAV (e.g., NAV for the secondary link) at a start of the downlink transmission #2. Here, the NAV for the primary link may be maintained. In the downlink transmission period #2, the STA2 may receive a PPDU from the AP on the secondary link, and may transmit a reception response (e.g., ACK or BA) for the PPDU to the AP on the secondary link. When the downlink transmission period #2 ends, the STA2 may set a NAV (e.g., NAV for the secondary link) again.

Figure 9:
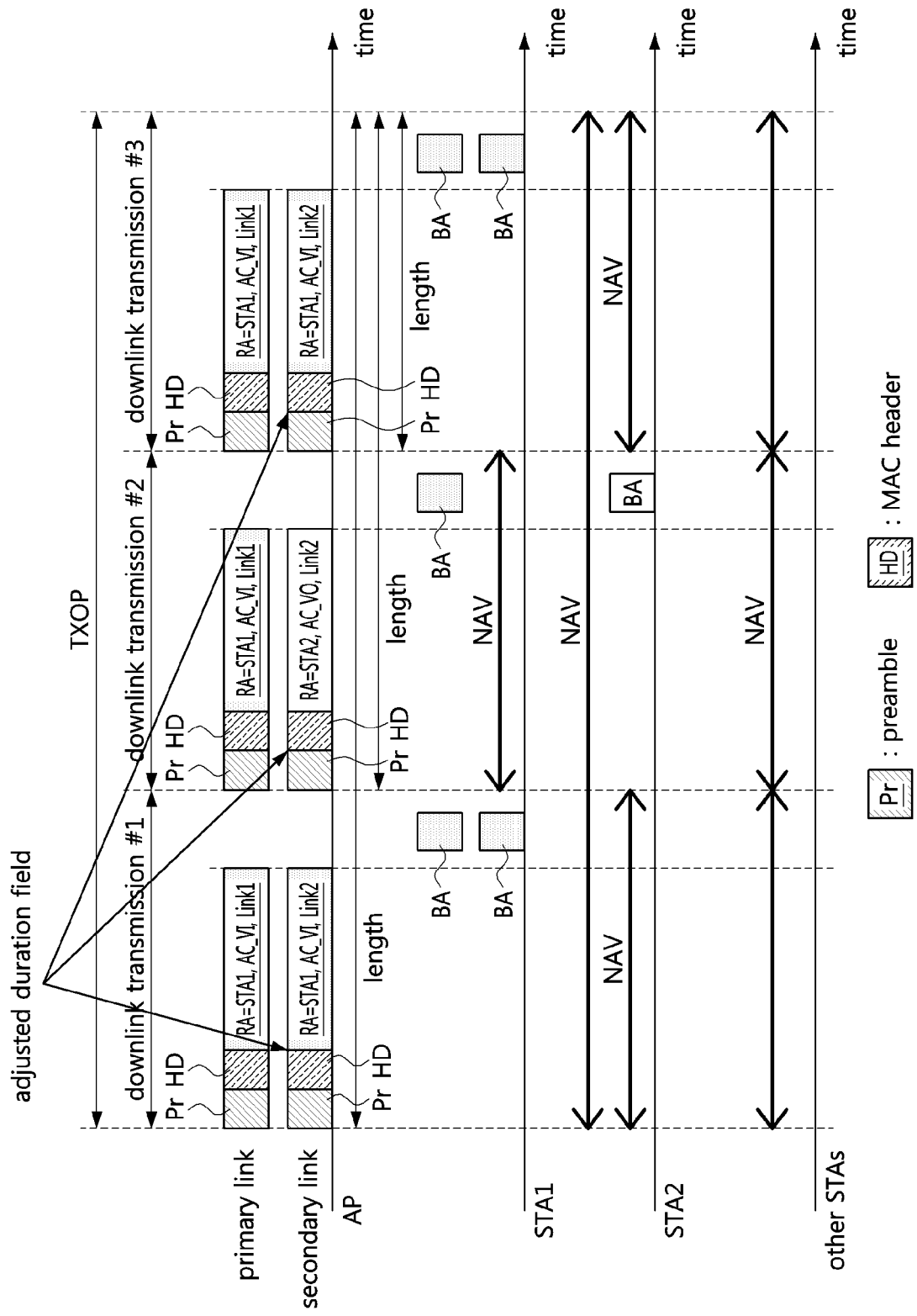
FIG. 9 is a timing diagram illustrating a first exemplary embodiment of a method for setting an NAV of a secondary link in a multi-link TXOP.

FIG. 9 is a timing diagram illustrating a first exemplary embodiment of a method for setting an NAV of a secondary link in a multi-link TXOP.

Referring to FIG. 9, a communication system may include an AP, STA1, STA2, and other STAs, and the AP, STA1, STA2, and other STAs may support a multi-link operation. For example, each of the AP, STA1, STA2, and other STAs may transmit and receive frames using multi-links(e.g., link 1 and link 2).

In the embodiment shown in FIG. 9, an AP may acquire a TXOP, and may share the TXOP with STAs (e.g., STA1, STA2, and other STAs). That is, the AP may be a TXOP holder. The AP may transmit data to the STA1 using multi-links within the TXOP. For example, the AP may perform downlink transmissions #1 to #3 within the TXOP. The AP may share the TXOP with the STA2 by using one link among multi-links in a downlink transmission period #2. When the TXOP is configured, STAs (e.g., STA2 and other STAs) other than the STA1 performing communication with the AP may set a NAV to be the length of the TXOP. Therefore, the STA2 may not be able to receive data from shared resources. In order to solve the above-described problem, downlink transmission may be performed as follows.

The AP, which is the TXOP holder, may set a link through which primary AC data is transmitted as a primary link, and set a link shared with the STA2 as a secondary link. The primary link may be a link 1, and the secondary link may be a link 2. In the downlink transmission period #1, the AP may transmit a PPDU to the STA1 on the primary link and the secondary link. A value of a duration field included in a MAC header of a PPDU transmitted on the primary link in the downlink transmission period #1 may be set to be equal to the length of the TXOP (e.g., multilink TXOP).

A value of a duration field included in a MAC header of a PPDU transmitted on the secondary link in each of the downlink transmission periods #1 to #3 may be set to be equal to the length of the corresponding downlink transmission period. The downlink transmission period may be a sum of a time required for transmission and reception of the PPDU and a time required for transmission and reception of a reception response (e.g., ACK or BA) for the corresponding PPDU. In this case, the NAV for the secondary link may be set to be shorter than the NAV for the primary link.

The STA2 may acquire the MAC header of the PPDU through the secondary link in the downlink transmission period #1, and may set a NAV based on the value of the duration field included in the MAC header. Here, the NAV may be set as long as the downlink transmission period #1. When the NAV is terminated, the STA2 may acquire a preamble and/or a MAC header of the PPDU through the secondary link in the downlink transmission period #2, and identify that an RA of the corresponding PPDU is the STA2 based on the preamble and/or the MAC header. In this case, the STA2 may perform a PPDU reception operation (e.g., decoding operation) in the downlink transmission period #2 without setting a NAV. In addition, the STA2 may acquire the MAC header of the PPDU through the secondary link in the downlink transmission period #3, and may set a NAV based on the value of the duration field included in the MAC header. Other terminals may set a NAV in the transmission periods #2 to #3 by identifying the MAC header on the secondary link.

Figure 10:
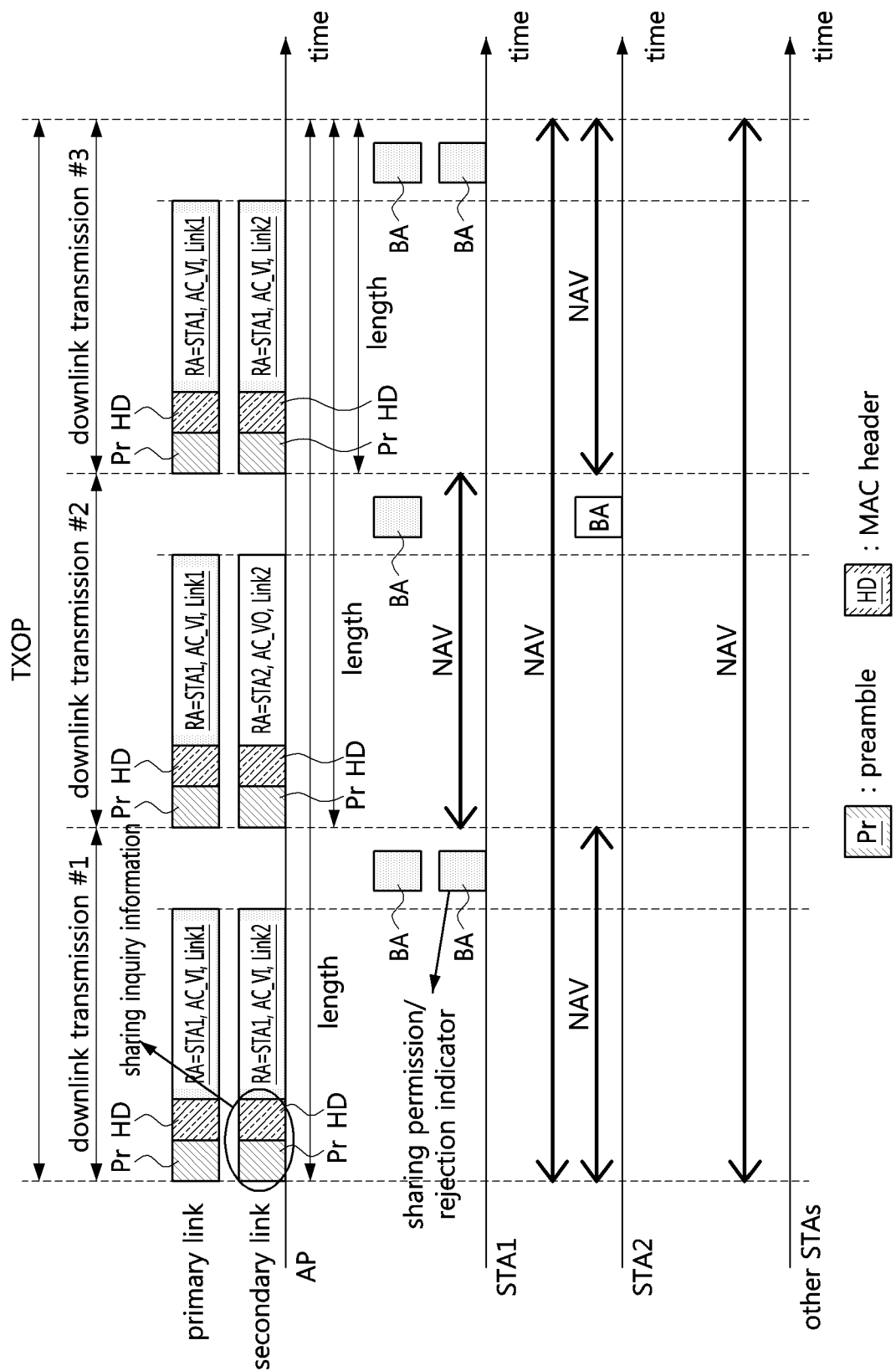
FIG. 10 is a timing diagram illustrating a first exemplary embodiment of a method for identifying sharing approval in an active sharing procedure.

FIG. 10 is a timing diagram illustrating a first exemplary embodiment of a method for identifying sharing approval in an active sharing procedure.

Referring to FIG. 10, a communication system may include an AP, STA1, STA2, and other STAs, and the AP, STA1, STA2, and other STAs may support a multi-link operation. For example, each of the AP, STA1, STA2, and other STAs may transmit and receive frames using multi-links (e.g., link 1 and link 2).

The AP may acquire a TXOP and may share the TXOP with the STAs (e.g., STA1, STA2, and other STAs). That is, the AP may be a TXOP holder. The AP, which is the TXOP holder, may set a link through which primary AC data is transmitted as a primary link, and may set a link shared with the STA2 as a secondary link. The primary link may be a link 1, and the secondary link may be a link 2.

The AP may transmit data to the STA1 using multi-links within the TXOP. For example, the AP may perform downlink transmissions #1 to #3 within the TXOP. When attempting to share the TXOP with the STA2 using the secondary link in the downlink transmission period #2, the AP may transmit a PPDU including sharing inquiry information through the secondary link in the downlink transmission period #1 before the downlink transmission period #2. The sharing inquiry information may be included in a preamble and/or MAC header of the PPDU. The sharing inquiry information may include one or more of an indicator for inquiring whether to share the secondary link, a level (e.g., urgent level or priority level) of data to be transmitted through the shared secondary link, information indicating a STA sharing the secondary link, and information indicating a sharing time for which the secondary link is shared.

When the sharing inquiry information is indicated by the MAC header, a combination of reserved bit(s) of a type field and a sub-type filed of a frame control field included in the MAC header may indicate that the MAC header is used to inquire whether the link is shared. An unused address field among four address fields may indicate the sharing inquiry information. In the address field having a size of 48 bits, 32 bits may indicate the STA sharing the secondary link or the level of data to be transmitted through the shared secondary link, and the remaining 16 bits may indicate the sharing time for which the secondary link is shared.

The STA1 may receive a PPDU through the secondary link in the downlink transmission period #1, and may identify the sharing inquiry information indicated by a preamble and/or a MAC header included in the PPDU. The STA1 may determine whether to share the secondary link based on the sharing inquiry information. In the downlink transmission period #1, the STA1 may generate a reception response (e.g., ACK or BA) for the PPDU, and may transmit the reception response to the AP on the secondary link. The reception response may include information indicating that sharing of the secondary link is allowed or information indicating that sharing of the secondary link is rejected. The information indicating whether to allow sharing of the link (e.g., secondary link) may be expressed by reserved bit(s) of a frame control field included in a BA FIG. 11 is a sequence chart illustrating a first exemplary embodiment of a multi-link TXOP sharing method based on a passive sharing scheme.

Figure 11:
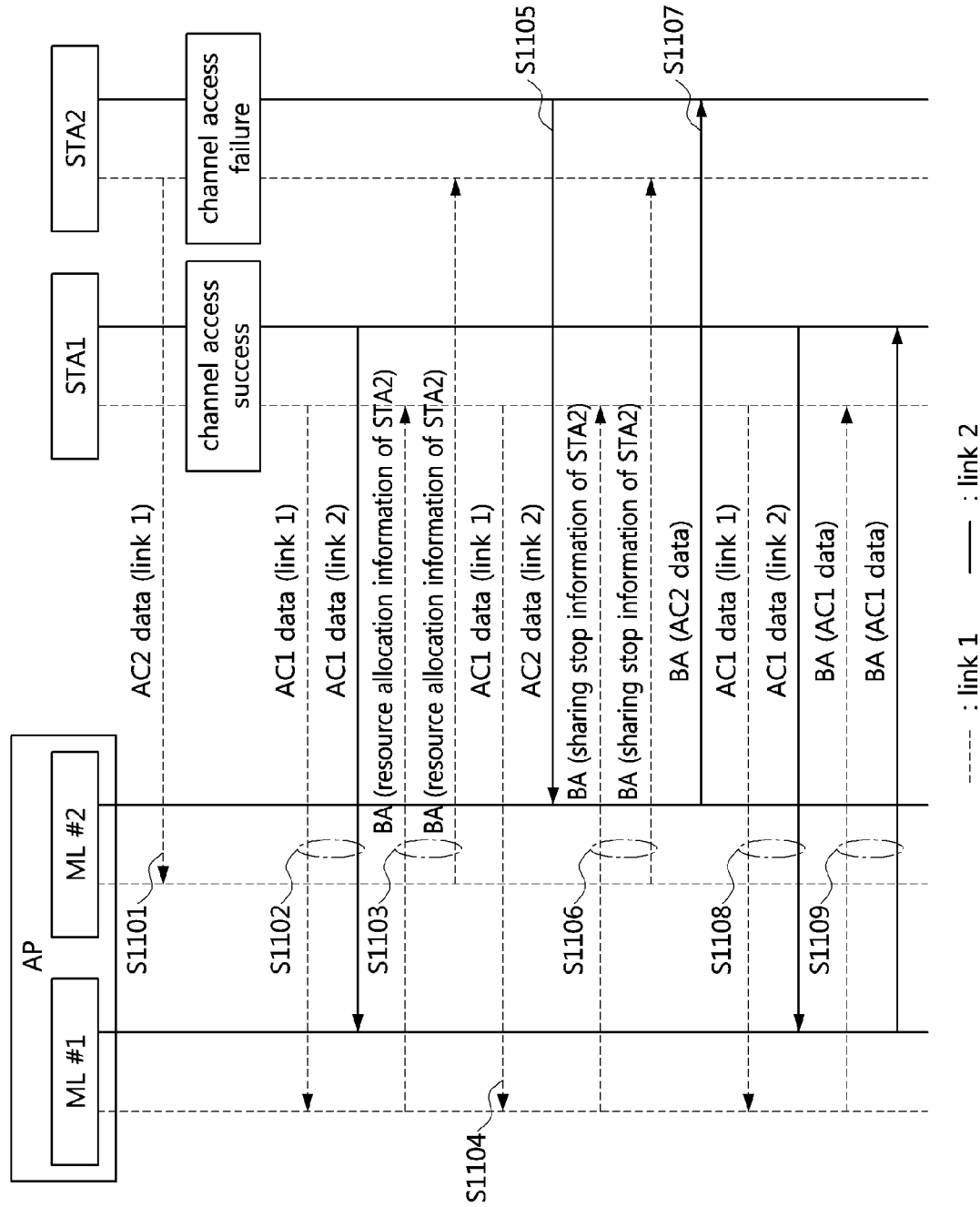
FIG. 11 is a sequence chart illustrating a first exemplary embodiment of a multi-link TXOP sharing method based on a passive sharing scheme

Referring to FIG. 11, a communication system may include an AP, STA1, and STA2, and the AP, STA1, and STA2 may support a multi-link operation. In the AP, an ML #1 may be multi-links for the STA1, and in the AP, an ML #2 may be multi-links for the STA2. For example, each of the AP, STA1, and STA2 may transmit and receive frames using multi-links (e.g., link 1 and link 2). A link 1 may be a primary link, and a link 2 may be a secondary link. The passive sharing scheme may mean that a communication node that receives data, which is not a TXOP holder that has acquired a TXOP, requests to share the TXOP for multi-links. When the passive sharing scheme is used, information of the primary AC may be transmitted to the AP, and the multi-link TXOP may be shared based on the information of the primary AC.

The STA2 may transmit AC2 data to the AP on the primary link (S1101). Before completion of data transmission by the STA2, the STA1 may start data transmission using multi-links by accessing the AP. For example, the STA1 may acquire a TXOP (e.g., multi-link TXOP), and transmit AC1 data to the AP on the link 1 and the link 2 (S1102). Reserved bit(s) included in a QoS control field of a PPDU including the AC1 data transmitted in the step S1102 may indicate one or more of information indicating the size of the AC1 data (e.g., the size of the remaining AC1 data), information indicating a transmission amount of the AC1 data, and information indicating a transmission time of the AC1 data.

The AP may receive the AC1 data (e.g., PPDU including the AC1 data) from the STA1 on the link 1 and the link 2 (S1102). The AP may determine resources to be allocated to the STA2 based on the information included in the PPDU (e.g., information indicating the size of the AC1 data, information indicating the transmission amount of the AC1 data, and/or information indicating the transmission time of the AC1 data). The resources to be allocated to the STA2 may be resources to be shared with the STA2 among resources allocated to the STA1. For example, the resources to be allocated to the STA2 may be a link (e.g., link 2) and/or a time period (e.g., TXOP).

The AP may transmit a reception response (e.g., ACK or BA) for the AC1 data to the STA1 and the STA2 (S1103). The reception response may be a multi-STA BA, and the multi-STA BA may include resource allocation information of the STA2. The resource allocation information of the STA2 may indicate that the link 2 is allocated to the STA2. In this case, the STA1 and the STA2 may determine that the link 2 is used for transmission of the STA2.

The STA1 may transmit the AC1 data to the AP on the link 1 (S1104) and the STA2 may transmit AC2 data to the AP on the link 2 (S1105). The AP may receive the AC1 data from the STA1 on the link 1 (S1104), and may transmit a reception response for the AC1 data to the STA1 and/or the STA2 (S1106). When sharing of the link 2 is stopped, a multi-STA BA may be transmitted to the STA1 and the STA2 as the reception response in the step S1106. The multi-STA BA may indicate that sharing of the link 2 is stopped. That is, the multi-STA BA may indicate that the link 2 is again used for the STA1. In addition, the AP may receive the AC2 data from the STA2 on the link 2 (S1105), and may transmit a reception response for the AC2 data to the STA2 (S1107).

The STA1 and the STA2 may receive the reception response (e.g., multi-STA BA) for the AC1 data on the link 1 (S1106). In this case, the STA1 and the STA2 may determine that sharing of the link 2 has been stopped based on the multi-STA BA. Accordingly, the STA1 may use the link 2 as well as the link 1 for a next uplink transmission, and the STA2 may stop uplink transmission using the link 2. In the step S1107, the STA2 may receive the reception response (e.g., ACK or BA) for the AC2 data on the link 2.

In the next uplink transmission period, the STA1 may transmit the AC1 data to the AP on the link 1 and the link 2 (S1108). The AP may receive the AC1 data from the STA1 on the link 1 and the link 2 (S1108), and may transmit a reception response for the AC1 data to the STA1 on the link 1 and the link 2 (S1109). The STA1 may receive the reception response for the AC1 data from the AP on the link 1 and the link 2 (S1109).

Figure 12:
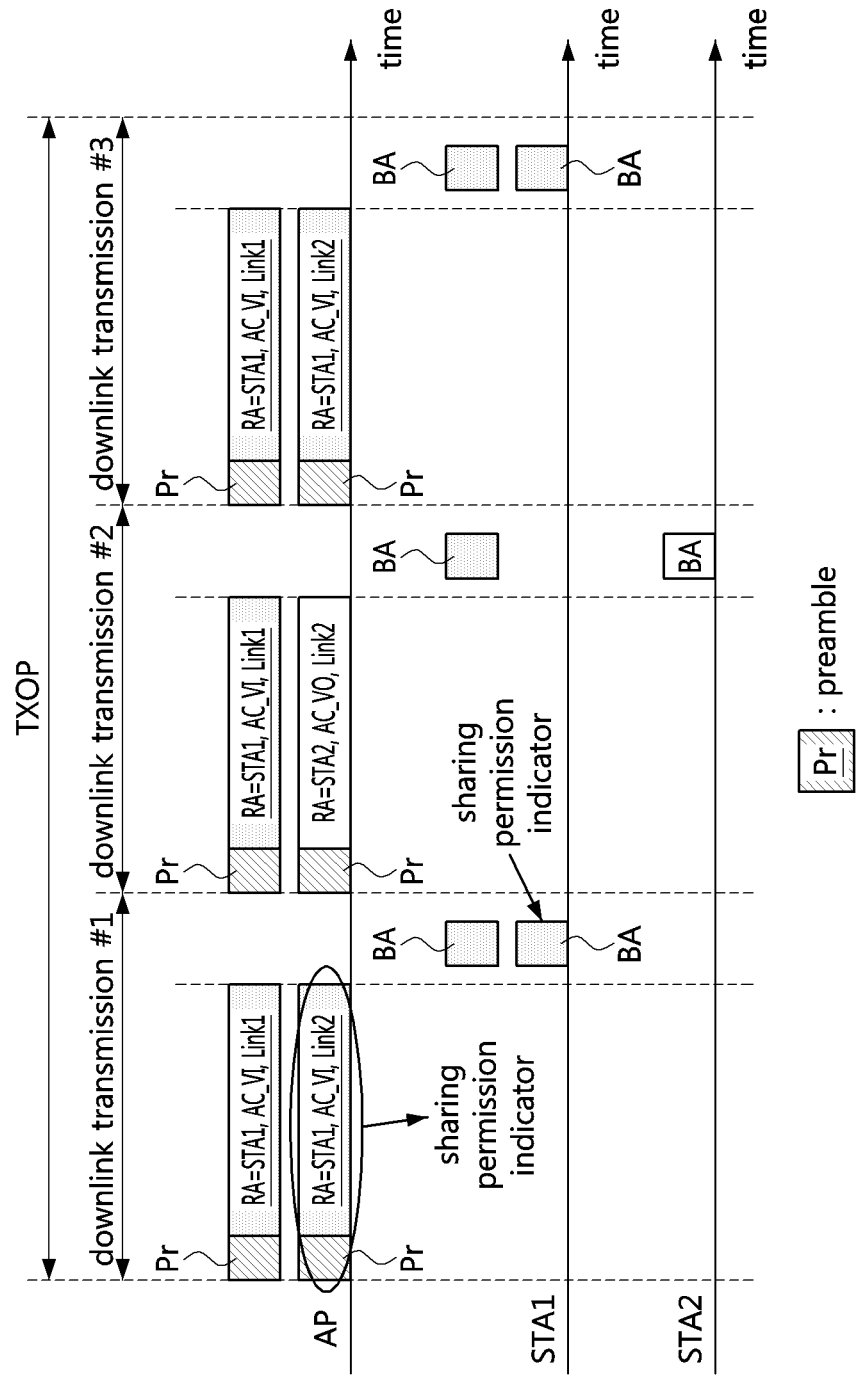
FIG. 12 is a timing diagram illustrating a first exemplary embodiment of a downlink multi-link TXOP sharing method.

FIG. 12 is a timing diagram illustrating a first exemplary embodiment of a downlink multi-link TXOP sharing method.

Referring to FIG. 12, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The AP may configure a TXOP (e.g., multi-link TXOP), and AC_VI may be set as a primary AC.

In a downlink transmission period #1, the AP may transmit a PPDU (e.g. preamble+AC_VI data) to the STA1 using the link 1 and the link 2, and the STA1 may transmit a reception response (e.g., ACK or BA) for the corresponding PPDU to the AP on the link 1 and the link 2. The AP may simultaneously receive BAs regardless of capability of the communication node.

In a downlink transmission period #2, the AP may transmit a PPDU (e.g., preamble+AC_VI data) to the STA1 using the link 1, and may transmit a PPDU (e.g., preamble+AC_VO data) to the STA2 using the link 2. In the downlink transmission period #2, which is a part of a multi-link TXOP, the link 2 may be shared for data transmission of the STA2. Accordingly, in the downlink transmission period #2, AC_VO data may be transmitted to the STA2 through the link 2 without a separate backoff delay. In the downlink transmission period #2, the STA1 may transmit a reception response for the received PPDU to the AP on the link 1, and the STA2 may transmit a reception response for the received PPDU to the AP on the link 2. The AP may simultaneously receive the BAs regardless of capability of the communication node.

In a downlink transmission period #3, the AP may transmit a PPDU (e.g., preamble+AC_VI data) to the STA1 using the link 1 and the link 2, and the STA1 may transmit a reception response (e.g., ACK or BA) for the corresponding PPDU to the AP on the link 1 and the link 2. The AP may simultaneously receive the BAs regardless of capability of the communication node.

The downlink transmission #2 may be performed using a shared TXOP (e.g., shared link) using one or more links among the multi-links. To support this operation, in the downlink transmission period #1 before the downlink transmission period #2, the AP (e.g., the TXOP holder) may transmit a PPDU including the primary AC data. Here, a MAC header of the PPDU may include information indicating a shared link (e.g., link used for sharing the multi-link TXOP) (hereinafter, referred to as 'sharing permission indicator'). The sharing permission indicator may indicate the link 2.

In the downlink transmission period #1, the STA1 may identify the sharing permission indicator included in the PPDU received on the link 2. In this case, the STA1 may determine whether to share the link 2 indicated by the sharing permission indicator. When it is determined that the link 2 is shared, the STA1 may transmit a BA including information indicating the permission of sharing the link 2 to the AP on the link 2 in the downlink transmission period #1.

In the downlink transmission period #1, the AP may receive the BA on the link 2, and it may be identified that sharing of the link 2 is permitted based on the information included in the BA. In this case, the AP may perform the downlink transmission #2 using the link 1 and the shared link 2.

Figure 13:
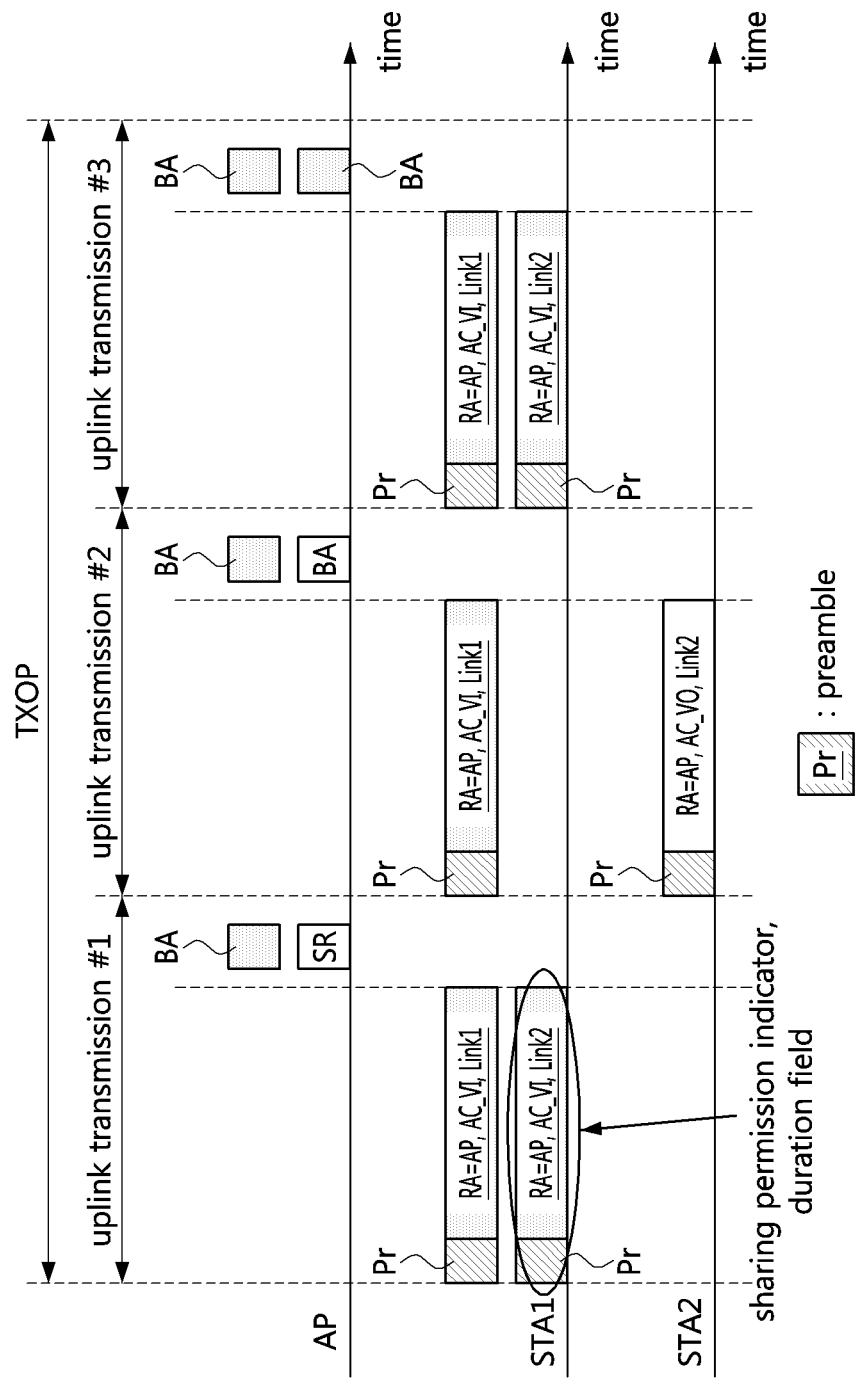
FIG. 13 is a timing diagram illustrating a first exemplary embodiment of an uplink multi-link TXOP sharing method.

FIG. 13 is a timing diagram illustrating a first exemplary embodiment of an uplink multi-link TXOP sharing method.

Referring to FIG. 13, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP), and AC_VI may be set as a primary AC.

In a period of an uplink transmission #1 (hereinafter, referred to as 'uplink transmission period #1'), the STA1 may transmit a PPDU including a preamble and AC_VI data to the AP on the link 1 and the link 2. A MAC header of the PPDU transmitted on the link 2 may include a sharing permission indicator. The sharing permission indicator may indicate that the link 2 is shared. That is, the sharing permission indicator may indicate that the link 2 is used for sharing a TXOP (e.g., multi-link TXOP).

In addition, a duration field included in a MAC header of the PPDU transmitted on the link 2 may indicate one or more of a length of a PPDU transmitted from the STA1 in a period of an uplink transmission #2 (hereinafter referred to as 'uplink transmission period #2'), information indicating a length of the uplink transmission period #2, information indicating a sharing time for which the TXOP is shared, and information for estimating the length of the sharing time for which the TXOP is shared. The AP may inform the STA2 of the length of the PPDU (e.g., PPDU in the uplink transmission period #2) based on the information indicated by the corresponding duration field.

In the uplink transmission period #1, the AP may receive the PPDU from the STA1 on the link 1 and the link 2. The AP may identify the sharing permission indicator included in a MAC header of the PPDU received on the link 2, and determine that the link 2 is used for sharing the TXOP based on the sharing permission indicator. In this case, the AP may transmit a BA for the AC_VI data to the STA1 on the link 1 that is not used for sharing the TXOP. Here, the BA may be a bitmap indicating a reception response for the AC_VI data (e.g., MAC service data unit (MSDU)) received on the link 1 and a reception response for the AC_VI data (e.g., MSDU) received on the link 2. The AP may transmit a sharing request (SR) requesting transmission of a QoS data frame of the STA2 on the link 2 used for sharing of the TXOP. The SR may be an action frame or a trigger frame. A receiver address (RA) of the SR may be set to the STA1 and/or the STA2.

In the uplink transmission period #1, the size of the BA may be set to be equal to the size of the SR. For example, padding may be added to a PPDU having a shorter length among the PPDU including the BA and the PPDU including the SR. In the uplink transmission period #1, the STA1 may receive the BA from the AP on the link 1 and may receive the SR from the AP on the link 2. When the SR is received from the AP, the STA1 may determine that the link 2 is shared for transmission of the STA2. In addition, in the uplink transmission period #1, the STA2 may receive the SR from the AP on the link 2. In this case, the STA2 may determine that the link 2 is shared for transmission of the STA2.

In the uplink transmission period #2, the STA1 may transmit a PPDU (e.g., preamble+AC_VI data) to the AP on the link 1, and the AP may receive the PPDU from the STA1 on the link 1. The AP may transmit a reception response for the PPDU to the STA1 on the link 1, and the STA1 may receive the reception response for the PPDU from the AP on the link 1. In the uplink transmission period #2, the STA2 may transmit a PPDU (e.g., preamble+AC_VO data) to the AP on the link 2, and the AP may receive the PPDU from the STA2 on the link 2. The AP may transmit a reception response for the PPDU to the STA1 and the STA2 on the link 2. Here, the reception response may be a multi-STA BA. The multi-STA BA may indicate that sharing of link 2 has been terminated. That is, when the multi-STA BA is received from the AP, the STA1 may determine that sharing of the link 2 has been terminated. The STA2 may recognize the multi-STA BA as a general BA.

In another exemplary embodiment, an RA of the SR transmitted in the uplink transmission period #1 may not be specified. In this case, the AP may perform downlink transmission in the uplink transmission period #2. When the downlink transmission is completed, the AP may transmit a BA (e.g., duplicated BA) to the STA1 on the link 2 to inform the STA1 that the sharing of the ink 2 has been terminated.

When the sharing of the link 2 is terminated, in a period of an uplink transmission #3 (hereinafter referred to as 'uplink transmission period #3'), the STA1 may transmit a PPDU (e.g., preamble+AC_VI data) to the AP using the link 1 and the link 2. The AP may receive the PPDU from the STA1 on the link 1 and the link 2, and may transmit a reception response for the PPDU to the STA1. The STA1 may receive the reception response for the PPDU from the AP on the link 1 and the link 2.

Figure 14:
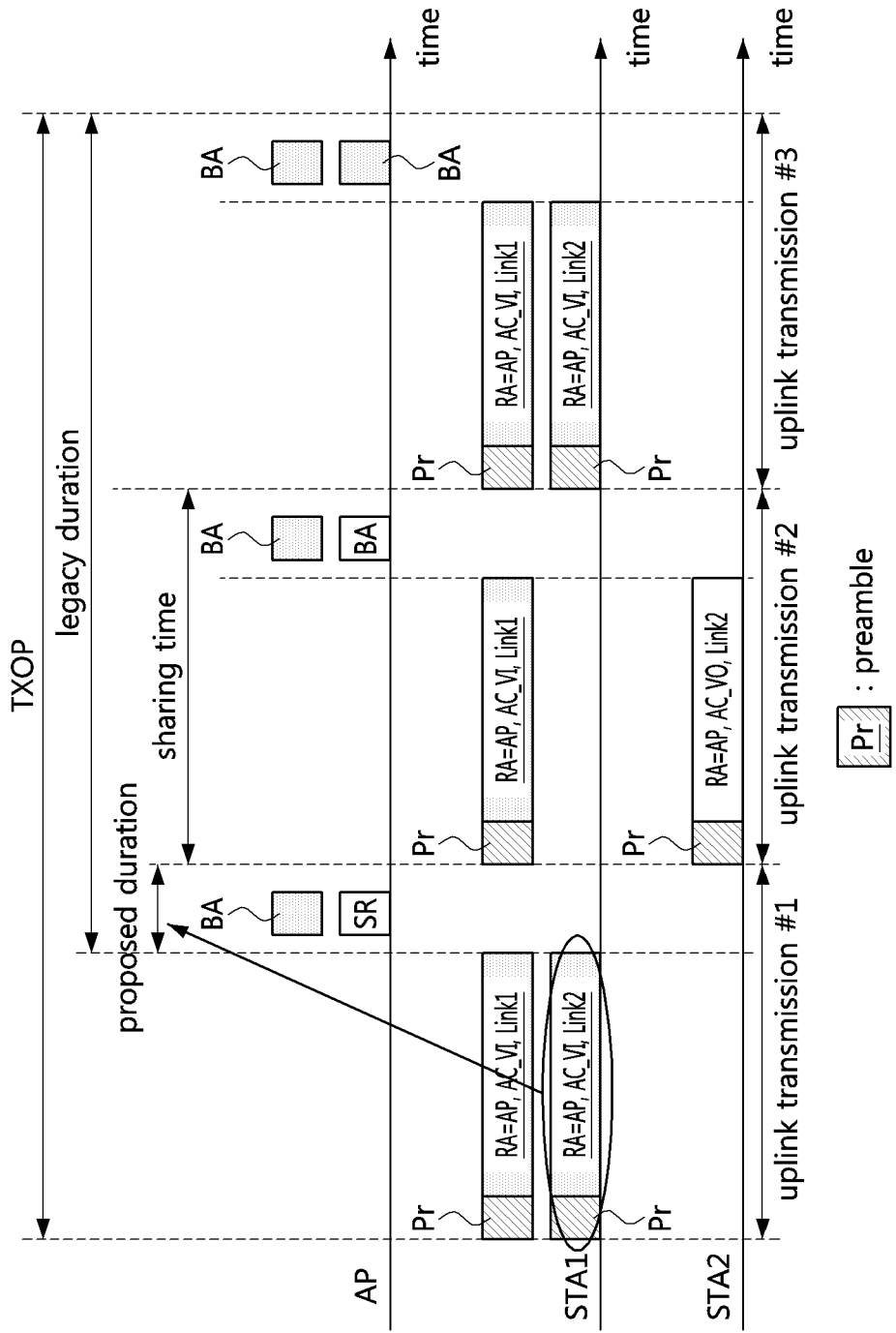
FIG. 14 is a timing diagram illustrating a first exemplary embodiment of a method of notifying a sharing time of a multi-link TXOP.

FIG. 14 is a timing diagram illustrating a first exemplary embodiment of a method of notifying a sharing time of a multi-link TXOP.

Referring to FIG. 14, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP), and AC_VI may be set as a primary AC.

The uplink transmission method shown in FIG. 14 may be the same as or similar to the uplink transmission method shown in FIG. 13. However, values of duration fields included in the MAC headers of the PPDUs transmitted on the link 2 in the uplink transmission period #1 may be set differently in the exemplary embodiments shown in FIGS. 13 and 14. For example, the MAC header of the PPDU transmitted on the link 2 in the uplink transmission period #1 may include a sharing permission indicator and a duration field. The sharing permission indicator may indicate a shared link (e.g., link used for sharing the TXOP). The duration field may include information necessary to estimate the sharing time.

In the exemplary embodiment shown in FIG. 13, the duration field may indicate a legacy duration, and the communication node may set a NAV based on the legacy duration. In the exemplary embodiment shown in FIG. 14, the duration field may indicate a proposed duration. The proposed duration may indicate a time from an ending time of the transmission of the PPDU in the uplink transmission period #1 to a starting time of the transmission of the PPDU in the uplink transmission period #2. In this case, the AP may identify the sharing time used for sharing the TXOP (e.g., multi-link TXOP) based on the duration field included in the PPDU acquired through the link 2 in the uplink transmission period #1. Here, the sharing time may be a value corresponding to (PPDU length+proposed duration (e.g., value indicated by the duration field)). The above-described legacy duration or proposed duration may include a transmission time of the PPDU including the corresponding duration field, and in this case, the sharing time may be the 'proposed duration'.

The AP may allocate time resources belonging to the sharing time to the STA2. In this case, the STA1 may configure all PPDUs to have the same length within the TXOP. For example, the STA1 may add padding to a PPDU having a shorter length. When the length of the PPDU varies within the TXOP, the STA1, which is the TXOP holder, may inform the AP of the sharing time used for the TXOP sharing by changing the value of the duration field included in the PPDU.

Figure 15:
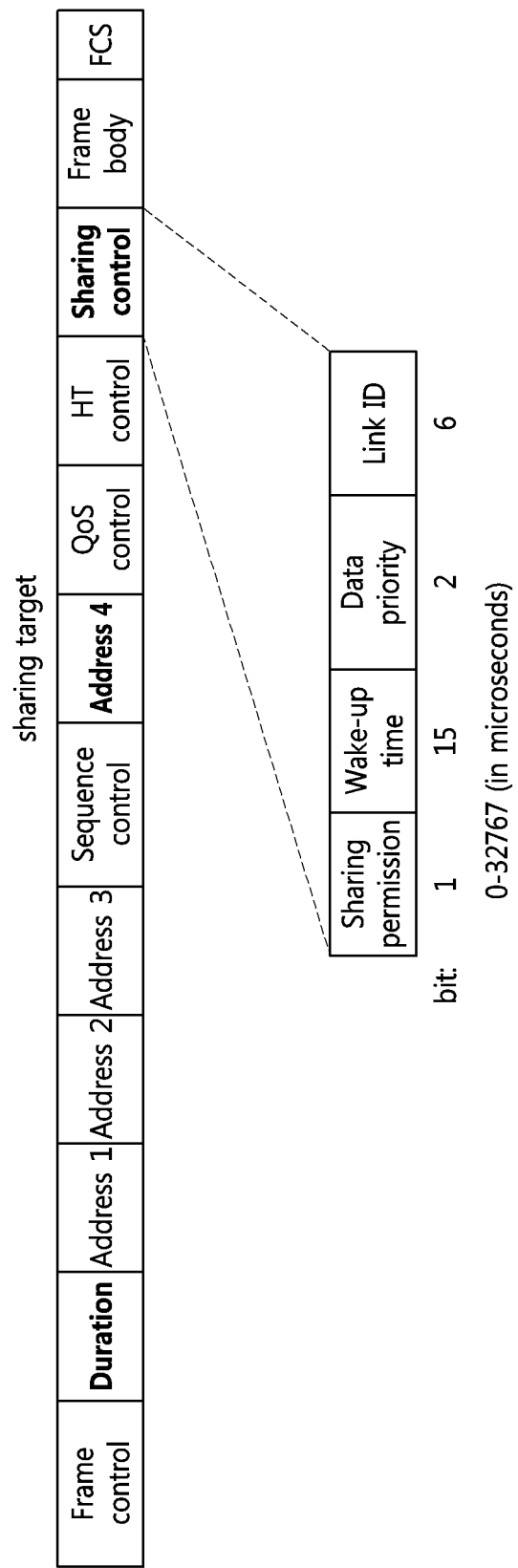
FIG. 15 is a block diagram illustrating a first exemplary embodiment of a frame including sharing information of a multi-link TXOP.

FIG. 15 is a block diagram illustrating a first exemplary embodiment of a frame including sharing information of a multi-link TXOP.

Referring to FIG. 15, a sharing control field may be defined using reserved bit(s) of a type and a sub-type field of a frame control field. The size of the sharing control field may be 24 bits. A duration field may indicate the legacy duration or the proposed duration shown in FIG. 14. An address 4 field may be set as a MAC address of a sharing target. Accordingly, the communication node may identify whether it is a sharing target based on the MAC address indicated by the address 4 field.

The sharing control field may include a sharing permission field, a wake-up time field, a data priority field, and a link ID field. The sharing permission field may mean the above-described sharing permission indicator. The sharing permission field (e.g., sharing permission subfield) may be set to a first value or a second value. The sharing permission field set to the first value may indicate that the link is not shared. The sharing permission field set to the second value may indicate that the link is shared.

The wake-up time field (e.g., wake-up time subfield) may indicate a time when the sharing target indicated by the address 4 field releases the NAV setting or a time when operating in a wake=up state. For example, the sharing target indicated by the address 4 field may perform a data reception operation at a time indicated by the wake-up time field. The data priority field (e.g., data priority subfield) may indicate a level (e.g., urgent level or priority level) of AC data. The link ID field (e.g., link ID subfield) may indicate the shared link (e.g., ID of the link). The link ID may be an identifier assigned to each link in a multi-link configuration procedure.

The sharing control field may be included in one or more MPDUs (e.g., the first MPDU) among aggregated MPDUs (A-MPDUs). The size of the sharing control field may be set in various ways, and parameters included in the sharing control field may also vary. The above-described exemplary embodiments (e.g., the exemplary embodiments shown in FIGS. 1 to 14) may be performed using the frame shown in FIG. 15.

Figure 16:
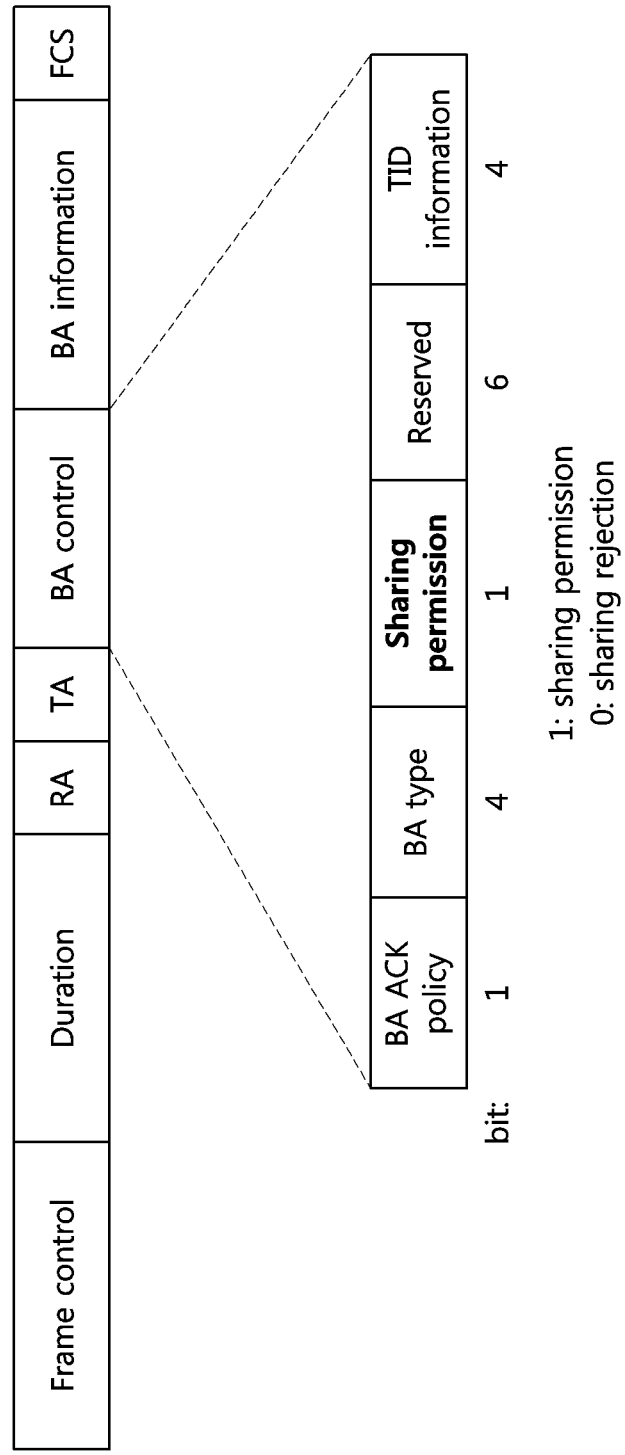
FIG. 16 is a block diagram illustrating a first exemplary embodiment of a frame including a sharing permission indicator of a multi-link TXOP.

FIG. 16 is a block diagram illustrating a first exemplary embodiment of a frame including a sharing permission indicator of a multi-link TXOP.

Referring to FIG. 16, a MAC header of a block ACK (BA) used in a shared TXOP (e.g., shared multi-link TXOP) may include a sharing permission field. The sharing permission field included in a BA control field may be defined using reserved bit(s) of a type field and a sub-type field of a frame control field included in the MAC header of the BA. The sharing permission field (e.g., sharing permission subfield) may be set to a first value or a second value. The sharing permission field set to the first value may indicate that the link is not shared. The sharing permission field set to the second value may indicate that the link is shared. The sharing permission field may mean the above-described sharing permission indicator.

In the above-described exemplary embodiments, a MAC header of a PPDU transmitted in the downlink transmission period or the uplink transmission period may include a sharing permission indicator indicating a link used for sharing the TXOP (e.g., multi-link TXOP). The communication node (e.g., STA1 or AP) may receive a PPDU including the sharing permission indicator, and may determine whether to share the link associated with the sharing permission indicator. The communication node may transmit a BA including information indicating whether to share the link (e.g., sharing permission indicator). The above-described exemplary embodiments (e.g., the exemplary embodiments shown in FIGS. 1 to 14) may be performed using the frame shown in FIG. 16.

Figure 17:
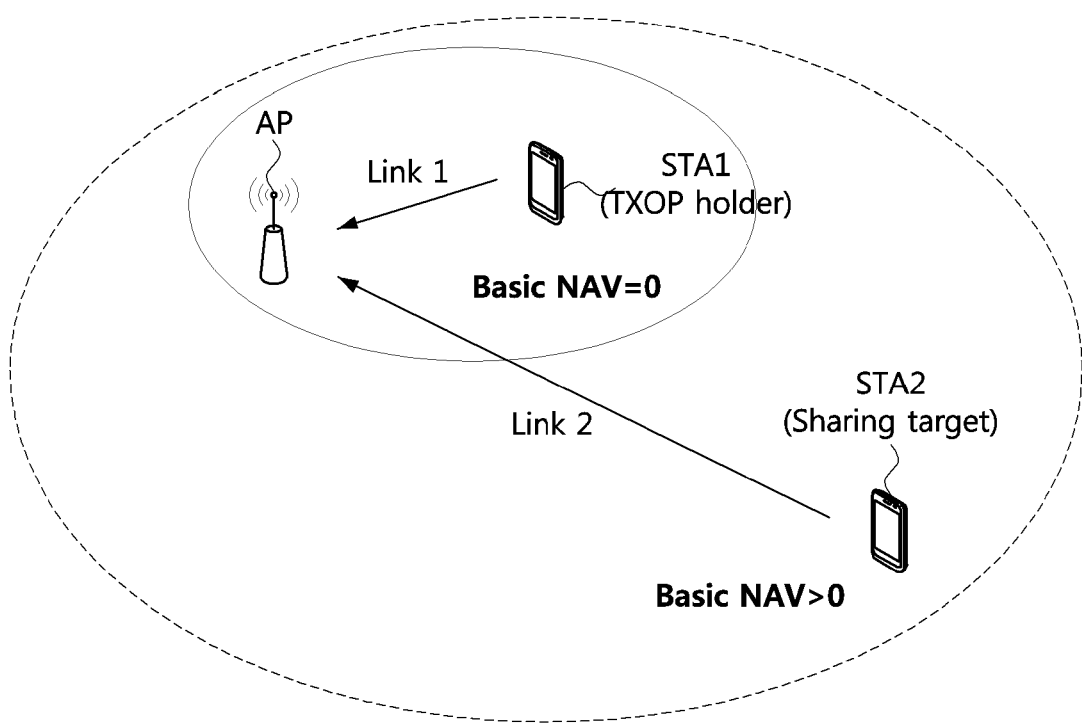
FIG. 17 is a conceptual diagram illustrating a case in which data transmission fails due to a NAV in a multi-link TXOP.

FIG. 17 is a conceptual diagram illustrating a case in which data transmission fails due to a NAV in a multi-link TXOP.

Referring to FIG. 17, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2. That is, the STA2 may be a sharing target.

In the shared TXOP (e.g., shared multi-link TXOP), the sharing target (e.g., STA2) may not be able to transmit data due to a basic NAV. Communication nodes supporting the IEEE 802.11ax specification and specifications after the IEEE 802.11ax may support a basic NAV and an intra-basic service set (BSS) NAV. When a timer of one NAV among the basic NAV and intra-BSS NAV is activated, the STA (e.g., the STA that has set the NAV) may not transmit data.

For example, because the NAV of the STA1 (e.g., basic NAV) is 0, the STA1 may transmit data on the link 1. Meanwhile, since the NAV of the STA2 (e.g., basic NAV) is greater than 0, the STA2 may not transmit data on the link 2 (e.g., link shared by the STA1). The NAV of the STA2 may be set by data transmission of an adjacent BSS. When the NAV of the STA2 is set, even when a trigger frame or a sharing request (SR) is received at the time of sharing the TXOP, the STA2 may not transmit data. Accordingly, the TXOP may be occupied by other communication nodes.

Figure 18:
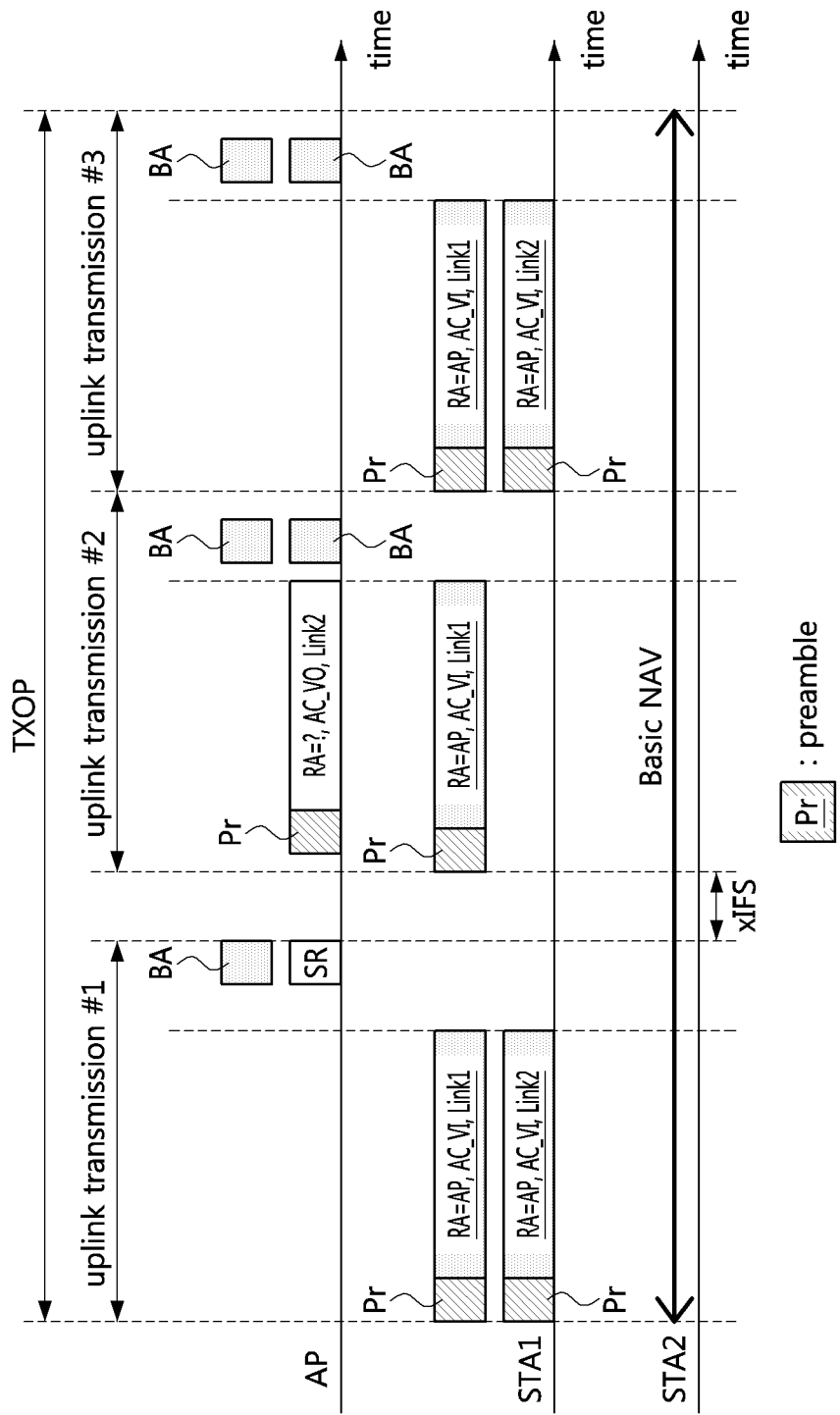
FIG. 18 is a timing diagram illustrating a first exemplary embodiment of a resource allocation method in a multi-link TXOP.

FIG. 18 is a timing diagram illustrating a first exemplary embodiment of a resource allocation method in a multi-link TXOP.

Referring to FIG. 18, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2. That is, the STA2 may be a sharing target. However, the STA2 may not be able to transmit data in the shared TXOP due to the setting of the NAV (e.g., basic NAV). In this case, the shared TXOP may be used by the AP.

For example, in the uplink transmission period #1, the AP may transmit an SR or trigger frame indicating sharing of the TXOP using the link 2. The STA2 may receive the SR or trigger frame from the AP on the link 2 in the uplink transmission period #1, and may identify that the TXOP is shared for transmission of the STA2 based on the SR or trigger frame. However, because the NAV of the STA2 (e.g., basic NAV) is set, the STA2 may not transmit data in the shared TXOP even when the SR or trigger frame is received.

Meanwhile, the AP may perform a channel sensing operation during an xIFS from the transmission time (e.g., transmission starting time or transmission ending time) of the SR or trigger frame. The xIFS may be greater than or equal to an SIFS. When a result of the channel sensing operation is determined to be an idle state (e.g., when a signal is not received during the xIFS), the AP may determine that the shared TXOP is not used by the STA2. In this case, the AP may transmit data using the shared TXOP. For example, the AP may transmit a PPDU (e.g., preamble+AC_VO data) on the link 2 in the uplink transmission period #2. An RA of the PPDU may indicate an arbitrary communication node. In addition, the AP may receive a PPDU (e.g., preamble+AC_VI) from the STA1 through the link 1 in the uplink transmission period #2, and transmit a response (e.g., ACK or BA) for the PPDU on the link 1 and the link 2. Here, the reception response may indicate that the sharing of the TXOP has been terminated.

In the uplink transmission period #2, the STA1 may receive the reception response for the PPDU from the AP through the link 1 and the link 2, and may determine that sharing of the TXOP has been terminated based on the reception response. In this case, the STA1 may transmit a PPDU (e.g., preamble+AC_VI) to the AP using the link 1 and the link 2 in the uplink transmission period #3. In the uplink transmission period #3, the AP may receive the PPDU from the STA1 through the link 1 and the link 2, and may transmit a reception response for the received PPDU to the STA1 on the link 1 and the link 2. The STA1 may receive the reception response for the PPDU from the AP on the link 1 and the link 2.

Figure 19:
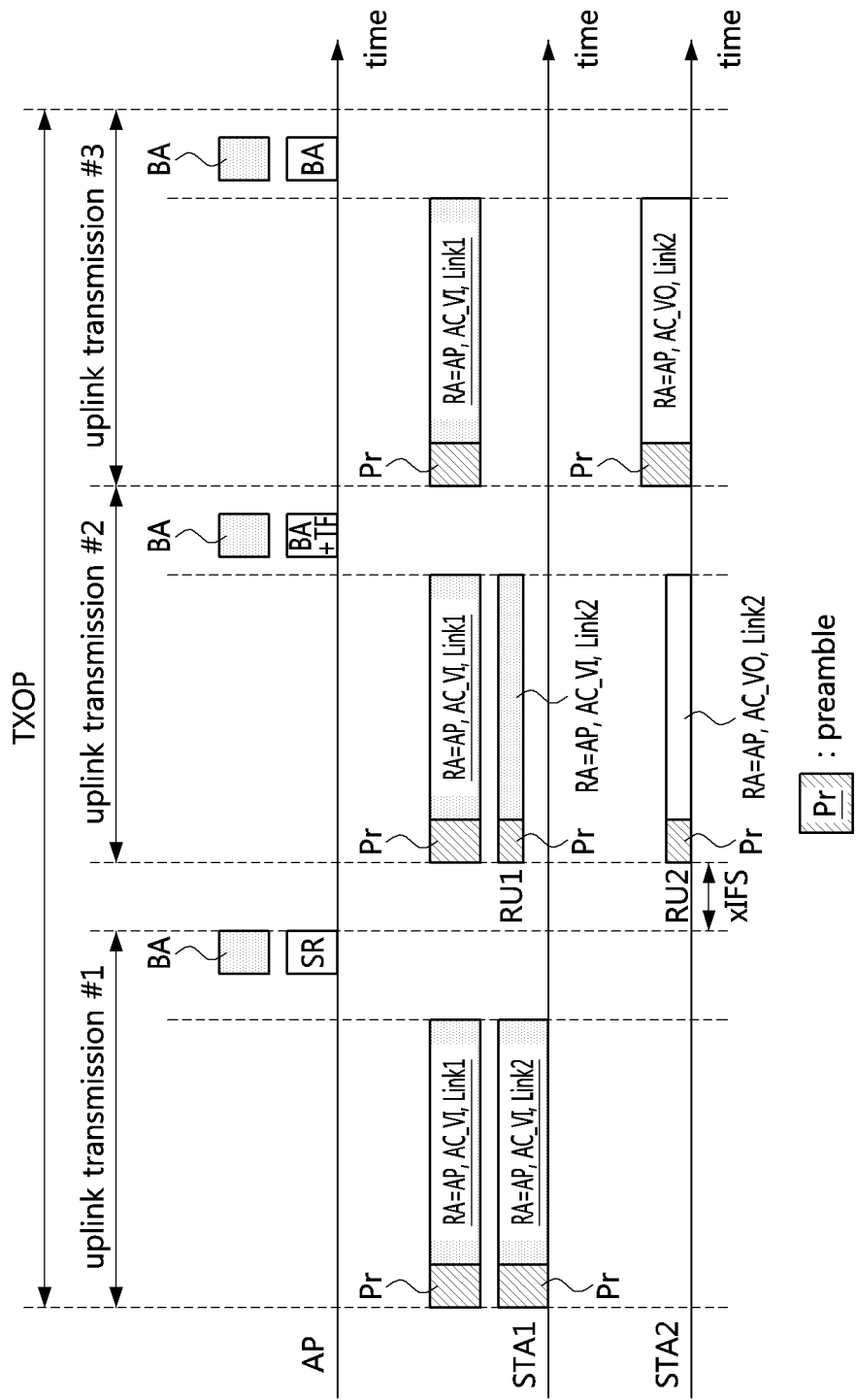
FIG. 19 is a timing diagram illustrating a second exemplary embodiment of a resource allocation method in a multi-link TXOP.

FIG. 19 is a timing diagram illustrating a second exemplary embodiment of a resource allocation method in a multi-link TXOP.

Referring to FIG. 19, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2. That is, the STA2 may be a sharing target. In the TXOP sharing procedure, resources may be allocated to the sharing target in units of RUs. It may be identified whether the TXOP may be shared based on the allocated resources.

In an uplink transmission period #1, the STA1 may transmit a PPDU (e.g., preamble+AC_VI data) to the AP using the link 1 and the link 2. The AP may receive the PPDU from the STA1 through the link 1 and the link 2 in the uplink transmission period #1. The AP may transmit a reception response (e.g., ACK or BA) for the PPDU on the link 1, and may transmit an SR or trigger frame on the link 2. The SR or trigger frame may be transmitted to the STA1 and the STA2. The STA1 and the STA2 may receive the SR or trigger frame from the AP.

In the exemplary embodiment shown in FIG. 13, all of the shared resources (e.g., resources of the link 2 in the uplink transmission period #2) may be allocated to the STA2. On the other hand, in the exemplary embodiment shown in FIG. 19, the shared resources (e.g., the resources of the link 2 in the uplink transmission period #2) may be allocated to the STA1 and the STA2 in units of RUs. For example, an RU1 of the link 2 may be allocated to the STA1, and an RU2 of the link 2 may be allocated to the STA2. Here, the RU may mean a preconfigured frequency resource. RU allocation information may be included in the SR or trigger frame.

Uplink transmission #2 may be performed after an xIFS from the time when the SR or trigger frame is received. The xIFS may be greater than or equal to an SIFS. In the uplink transmission period #2, the STA1 may transmit a PPDU (e.g., preamble+AC_VI) to the AP using the link 1, and may transmit a PPDU (e.g., preamble+AC_VI) to the AP using the RU1 of the link 2. In the uplink transmission period #2, the STA2 may transmit a PPDU (e.g., preamble+AC_VO) to the AP using the RU2 of the link 2.

When the PPDU of the STA2 is received in a sharing time after the xIFS from the transmission time of the SR or trigger frame, the AP may determine that a NAV (e.g., basic NAV) of the STA2 is not set. In this case, the AP may simultaneously process a BA operation and a next RU allocation operation by transmitting (BA+trigger frame (TF)) in response to the PPDU received through the link 2 in the uplink transmission period #2. The BA may be concatenated with the trigger frame (TF). In addition, the AP may transmit the BA in response to the PPDU received through the link 1 in the uplink transmission period #2. When the length of the BA transmitted on the link 1 of the uplink transmission period #2 and the length of the (BA+trigger frame (TF)) transmitted on the link 2 of the uplink transmission period #2 are different, padding may be added to a signal having a shorter length. In this case, the length of the BA transmitted on the link 1 of the uplink transmission period #2 may be set to be equal to the length of the (BA+trigger frame (TF)) transmitted on the link 2 of the uplink transmission period #2.

In the uplink transmission period #3, all resources (e.g., RU1 and RU2) of the link 2 may be allocated to the STA2. Accordingly, the STA2 may transmit a PPDU to the AP through the link 2 in the uplink transmission period #3, and the STA1 may transmit a PPDU to the AP through the link 1 in the uplink transmission period #3.

Figure 20:
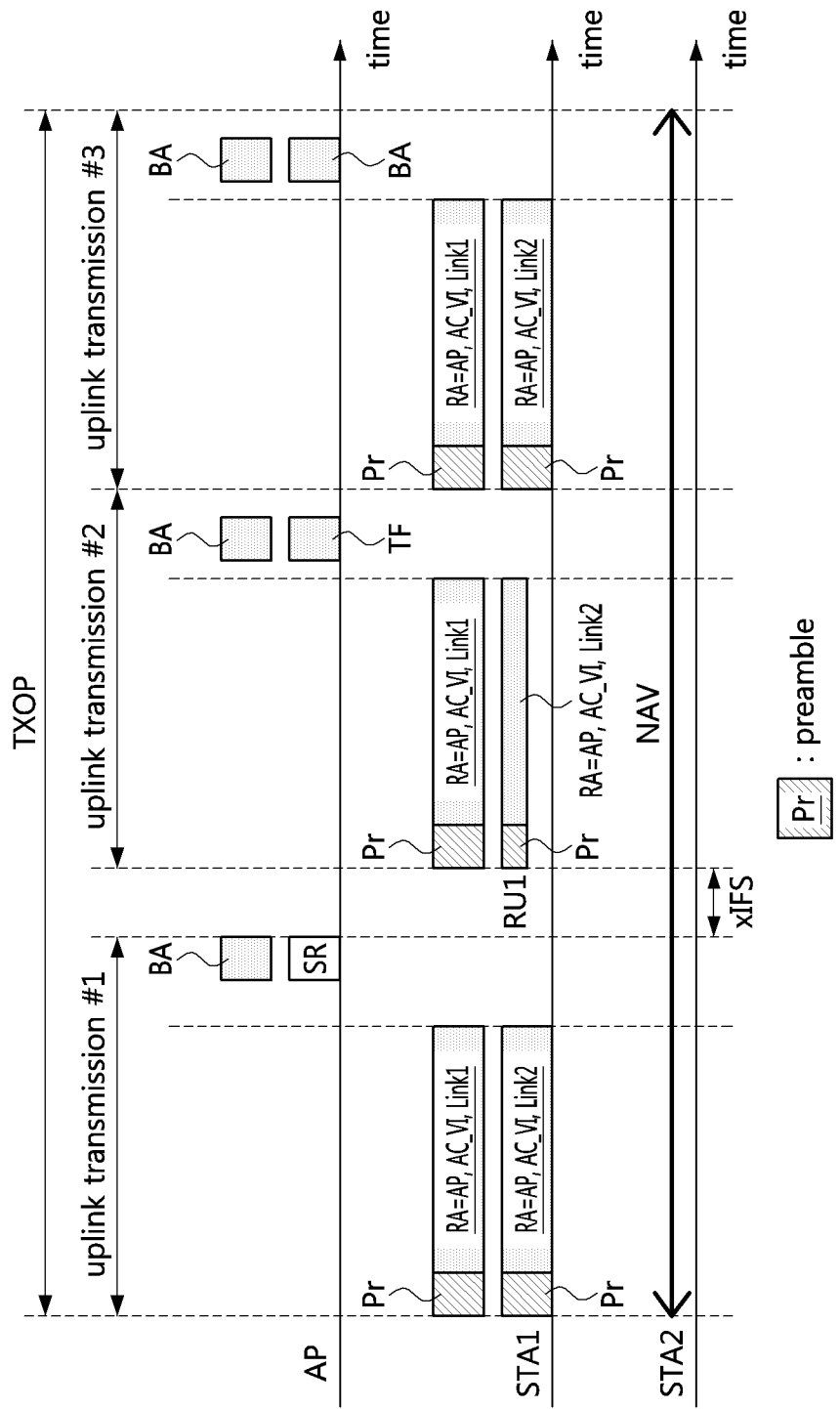
FIG. 20 is a timing diagram illustrating a third exemplary embodiment of a resource allocation method in a multi-link TXOP.

FIG. 20 is a timing diagram illustrating a third exemplary embodiment of a resource allocation method in a multi-link TXOP.

Referring to FIG. 20, a communication system may include an AP, STA1, and STA2, and the AP, STA1, and STA2 may support a multi-link operation. For example, each of the AP, STA1, and STA2 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2. That is, the STA2 may be a sharing target. The STA2 (e.g., sharing target) may not be able to transmit data in the shared TXOP due to setting of an NAV (e.g., basic NAV). In this case, the shared TXOP may be returned to the STA1 (e.g., TXOP holder).

In the uplink transmission period #1, the STA1 may transmit a PPDU (e.g., preamble+AC_VI data) to the AP using the link 1 and the link 2. The AP may receive the PPDU from the STA1 through the link 1 and the link 2 in the uplink transmission period #1. The AP may transmit a reception response (e.g., ACK or BA) for the PPDU on the link 1, and may transmit an SR or trigger frame on the link 2. The SR or trigger frame may be transmitted to the STA1 and the STA2. The STA1 and the STA2 may receive the SR or trigger frame from the AP.

Here, shared resources (e.g., resources of the link 2 in the uplink transmission period #2) may be allocated to the STA1 and the STA2 in units of RUs. For example, an RU1 of the link 2 may be allocated to the STA1, and an RU2 of the link 2 may be allocated to the STA2. Here, the RU may mean a preconfigured frequency resource. RU allocation information may be included in the SR or trigger frame.

Uplink transmission #2 may be performed after an xIFS from the time when the SR or trigger frame is received. The xIFS may be greater than or equal to an SIFS. In the uplink transmission period #2, the STA1 may transmit a PPDU (e.g., preamble+AC_VI) to the AP using the link 1, and may transmit a PPDU (e.g., preamble+AC_VI) to the AP using the RU1 of the link 2. In the uplink transmission period #2, the AP may receive the PPDU from the STA1 on the link 1 and the PPDU in the RU1 of the link 2. In this case, the AP may transmit a reception response (e.g., ACK or BA) for the PPDU to the STA1 on the link 1 of the uplink transmission period #2.

In the uplink transmission period #2, the STA2 may not be able to transmit data due to setting of a NAV. Therefore, in the uplink transmission period #2, the AP may not be able to receive data of the STA2 through the RU2 of the link 2. In this case, the AP may determine that a NAV is set in the STA2. Accordingly, the AP may generate a trigger frame (TF) indicating that all resources (e.g., RU1 and RU2) of the link 2 are allocated to the STA1, and transmit the trigger frame (TF) through the link 2 of the uplink transmission period #2. When the length of the BA transmitted on the link 1 of the uplink transmission period #2 and the length of the trigger frame transmitted on the link 2 of the uplink transmission period #2 are different, padding may be added to a signal having a shorter length. In this case, the length of the BA transmitted on the link 1 of the uplink transmission period #2 may be set to be equal to the length of the trigger frame transmitted on the link 2 of the uplink transmission period #2.

The STA1 and/or STA2 may receive the trigger frame (TF) through the link 2 in the uplink transmission period #2, and identify that all resources (e.g., RU1 and RU2) of the link 2 are allocated to the STA1 based on the information included in the trigger frame (TF). Accordingly, in the uplink transmission period #3, the STA1 may perform communication using not only the link 1 but also the link 2, and the STA2 may not transmit data on the link 2. That is, the TXOP shared to the STA2 may be released.

Figure 21:
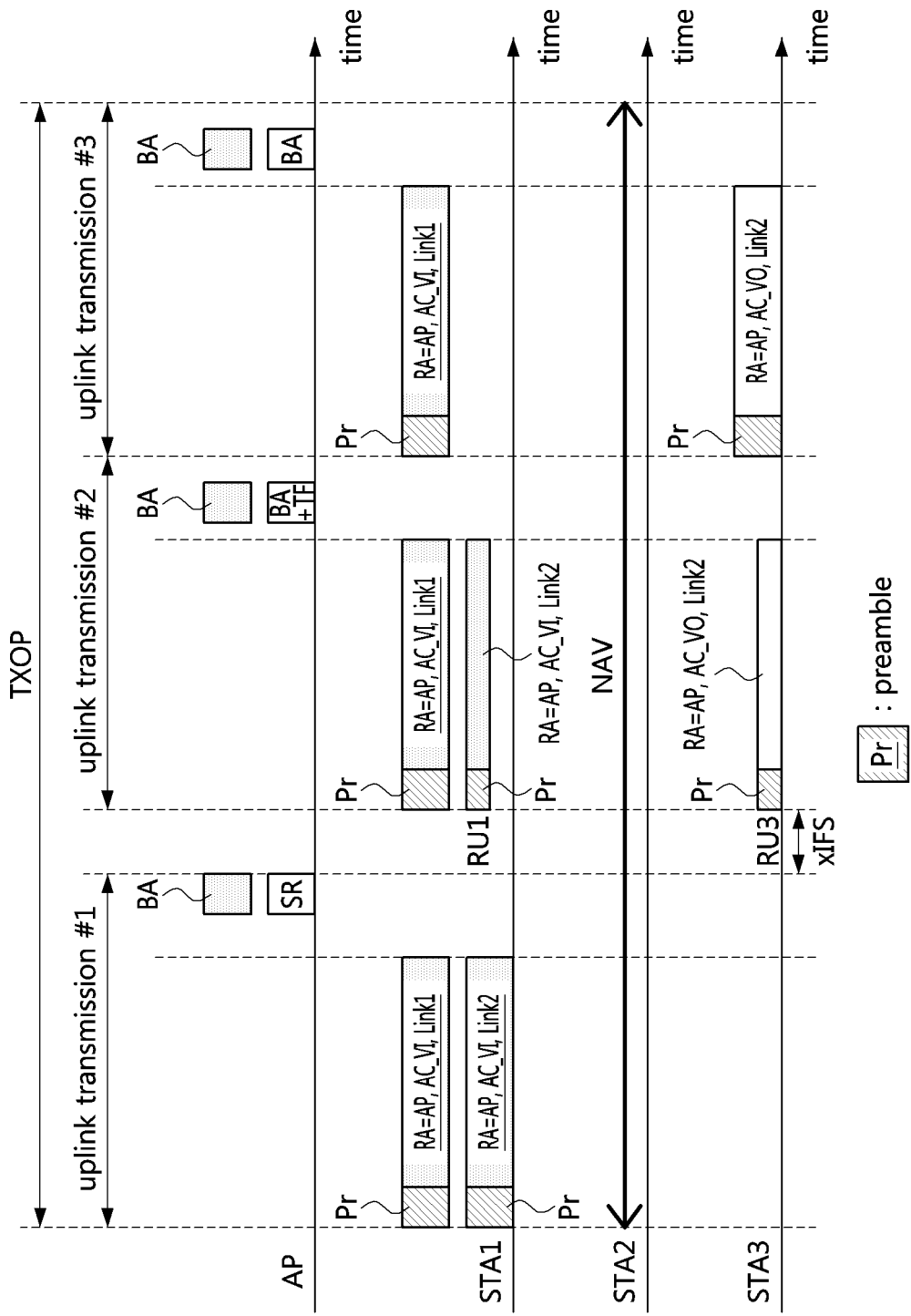
FIG. 21 is a timing diagram illustrating a fourth exemplary embodiment of a resource allocation method in a multi-link TXOP.

FIG. 21 is a timing diagram illustrating a fourth exemplary embodiment of a resource allocation method in a multi-link TXOP.

Referring to FIG. 21, a communication system may include an AP, STA1, STA2, and STA3, and the AP, STA1, STA2, and STA3 may support a multi-link operation. For example, each of the AP, STA1, STA2, and STA3 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2 and/or the STA3. That is, the STA2 and the STA3 may be sharing targets. In the TXOP sharing procedure, shared resources may be allocated to a plurality of sharing targets (e.g., STA2 and STA3) in units of RUs.

In the uplink transmission period #1, the STA1 may transmit a PPDU (e.g., preamble+AC_VI data) to the AP using the link 1 and the link 2. The AP may receive the PPDU from the STA1 through the link 1 and the link 2 in uplink transmission period #1. The AP may transmit a reception response (e.g., ACK or BA) for the PPDU on the link 1, and may transmit an SR or trigger frame on the link 2. The SR or trigger frame may be transmitted to the STA1, the STA2, and the STA3. The STA1, STA2, and STA3 may receive the SR or trigger frame from the AP.

In the exemplary embodiment shown in FIG. 13, all of shared resources (e.g., resources of the link 2 in the uplink transmission period #2) may be allocated to the STA2. On the other hand, in the exemplary embodiment shown in FIG. 21, shared resources (e.g., resources of the link 2 in the uplink transmission period #2) may be allocated to the STA1, STA2, and STA3 in units of RUs. For example, an RU1 of the link 2 may be allocated to the STA1, an RU2 of the link 2 may be allocated to the STA2, and an RU3 of the link 3 may be allocated to the STA3. Here, the RU may mean a preconfigured frequency resource. RU allocation information may be included in the SR or trigger frame.

Uplink transmission #2 may be performed after an xIFS from the time when the SR or trigger frame is received. The xIFS may be greater than or equal to an SIFS. In the uplink transmission period #2, the STA1 may transmit a PPDU (e.g., preamble+AC_VI) to the AP using the link 1, and may transmit a PPDU (e.g., preamble+AC_VI) to the AP using the RU1 of the link 2. In the uplink transmission period #2, the AP may receive the PPDU from the STA1 on the link 1 and the PPDU in the RU1 of the link 2. In this case, the AP may transmit a reception response (e.g., ACK or BA) for the PPDU to the STA1 on the link 1 of the uplink transmission period #2.

In the uplink transmission period #2, the STA2 may not be able to transmit data due to setting of a NAV. Accordingly, in the uplink transmission period #2, the AP may not be able to receive data of the STA2 through the RU2 of the link 2. In the uplink transmission period #2, the STA3 may transmit a PPDU (e.g., preamble+AC_VO) to the AP using an RU3 of the link 2. In the uplink transmission period #2, the AP may receive the PPDU from the STA3 through the RU3 of the link 2. Accordingly, the AP may determine that a NAV is set in the STA2 and that a NAV is not set in the STA3.

In this case, the AP may simultaneously process a BA operation and a next RU allocation operation by transmitting (BA+trigger frame (TF)) in response to the PPDU received through the link 2 in the uplink transmission period #2. The BA may be concatenated with the trigger frame (TF). The trigger frame TF may indicate that all resources (e.g., RU1, RU2, and RU2) of the link 2 are allocated to the STA3. Upon receiving the trigger frame (TF), the STA1, STA2, and STA3 may determine that all resources of the link 2 are used for the STA3.

In addition, the AP may transmit a BA in response to the PPDU received through the link 1 in the uplink transmission period #2. When the length of the BA transmitted on the link 1 of the uplink transmission period #2 and the length of the (BA+trigger frame (TF)) transmitted on the link 2 of the uplink transmission period #2 are different, padding may be added to a signal having a shorter length. In this case, the length of the BA transmitted on the link 1 of the uplink transmission period #2 may be set to be equal to the length of the (BA+trigger frame (TF)) transmitted on the link 2 of the uplink transmission period #2.

In the uplink transmission period #3, all resources (e.g., RU1, RU2, RU3) of the link 2 may be allocated to the STA3. Accordingly, the STA3 may transmit a PPDU to the AP through the link 2 in the uplink transmission period #3, and the STA1 may transmit a PPDU to the AP through the link 1 in the uplink transmission period #3.

Figure 22:
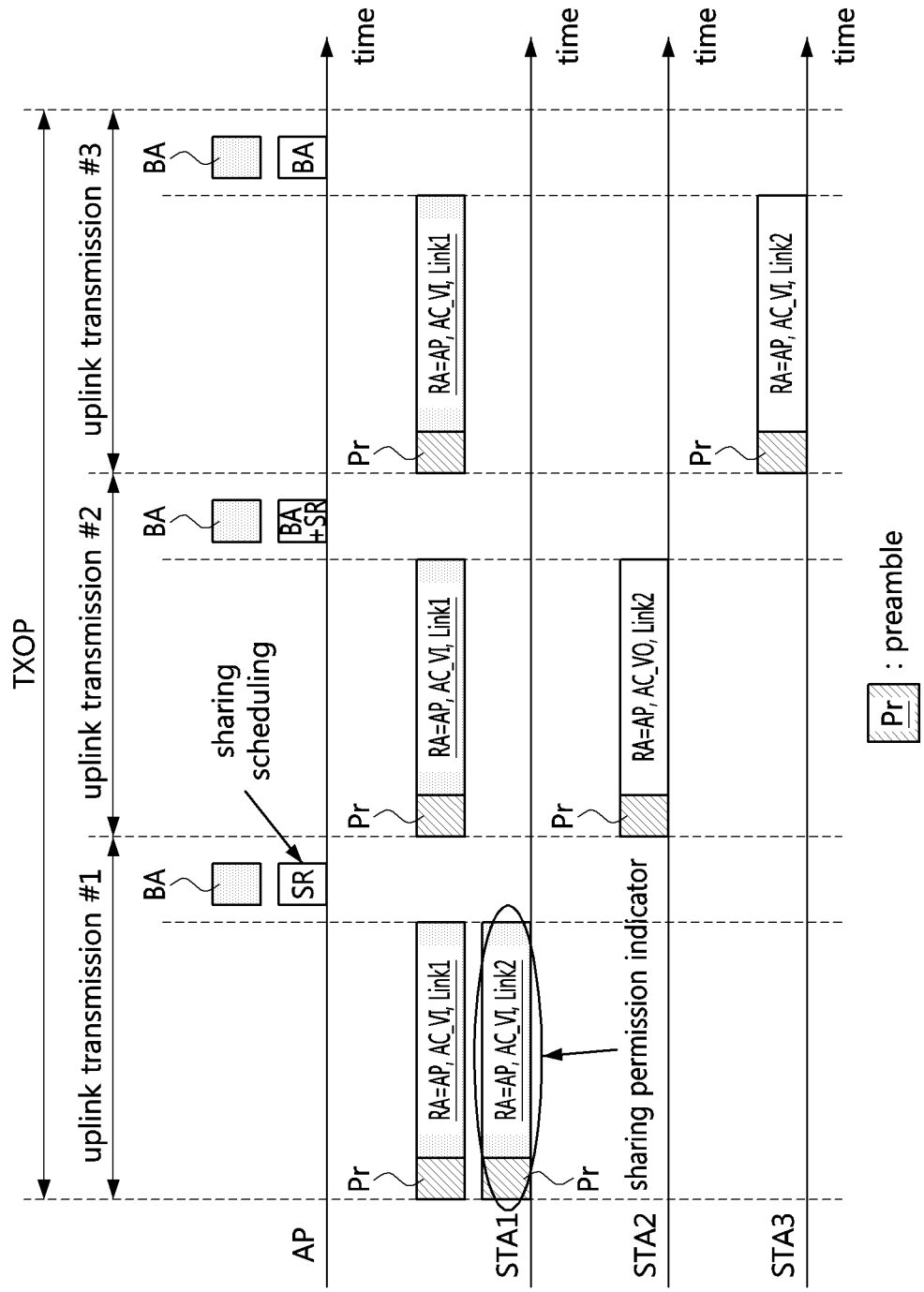
FIG. 22 is a timing diagram illustrating a fifth exemplary embodiment of a resource allocation method in a multi-link TXOP.

FIG. 22 is a timing diagram illustrating a fifth exemplary embodiment of a resource allocation method in a multi-link TXOP.

Referring to FIG. 22, a communication system may include an AP, STA1, STA2, and STA3, and the AP, STA1, STA2, and STA3 may support a multi-link operation. For example, each of the AP, STA1, STA2, and STA3 may transmit and receive frames using multi-links (e.g., link 1 and link 2). A link 1 may be a primary link, and a link 2 may be a secondary link. The STA1 may configure a TXOP (e.g., multi-link TXOP). That is, the STA1 may be a TXOP holder. The TXOP configured by the STA1 may be shared with the STA2 and/or the STA3. That is, the STA2 and the STA3 may be sharing targets. In the TXOP sharing procedure, shared resources may be allocated to a plurality of sharing targets (e.g., STA2 and STA3) in units of RUs.

In the uplink transmission period #1, the STA1 may transmit a PPDU (e.g., preamble+AC_VI data) to the AP using the link 1 and the link 2. The PPDU transmitted on the link 1 of the uplink transmission period #1 may include a sharing permission indicator (e.g., sharing control field shown in FIG. 15 or 16). The AP may receive the PPDU from the STA1 through the link 1 and the link 2 in the uplink transmission period #1. The AP may transmit a reception response (e.g., ACK or BA) for the PPDU on the link 1, and may transmit an SR or trigger frame on the link 2. The SR or trigger frame may be transmitted to the STA1, STA2, and STA3. The STA1, STA2, and STA3 may receive the SR or trigger frame from the AP.

The SR or trigger frame may include resource allocation information. The resource allocation information may include information indicating a shared link, information indicating a sharing time (e.g., the length of the sharing time, a starting time of the sharing time, and/or an ending time of the sharing time), information (e.g., address) indicating a communication node using the corresponding sharing time and/or sharing order information. Information elements included in the resource allocation information may be arranged in the sharing order. The sharing time may be the uplink transmission period #2 and/or the uplink transmission period #3. The resource allocation information may include information indicating the link 2, information indicating the uplink transmission period #2, information indicating the STA2 using the uplink transmission period #2, information indicating the uplink transmission period #3, and information indicating the STA3 using the uplink transmission period #3.

Accordingly, the communication node (e.g., STA, STA2, STA3) may identify the resource allocation information included in the SR or trigger frame, identify that the link 2 is allocated to the STA2 in the uplink transmission period #2 based on the resource allocation information, and identify that the link 2 is allocated to the STA3 in the uplink transmission period #3 based on the resource allocation information.

In the uplink transmission period #2, the STA1 may transmit a PPDU to the AP through the link 1, and the AP may receive the PPDU from the STA1 through the link 1. The AP may transmit a reception response for the PPDU to the STA1 on the link 1. In the uplink transmission period #2, the STA2 may transmit a PPDU to the AP through the link 2, and the AP may receive the PPDU from the STA2 through the link 2. The AP may transmit a reception response for the PPDU, 'reception response for the PPDU+SR', or 'reception response for the PPDU+trigger frame' to the STA2 on the link 2. Here, the SR or trigger frame may include an address of a sharing target (e.g., STA3) using a next sharing time (e.g., uplink transmission period #3). That is, the SR or trigger frame may be used to inform the sharing target (e.g., STA3) that sharing of the TXOP (e.g., multi-link TXOP) is started. Accordingly, the STA3 receiving the SR or the trigger frame may determine that the uplink transmission period #3, which is the next sharing time, starts.

In the uplink transmission period #3, the STA1 may transmit a PPDU to the AP through the link 1, and the AP may receive the PPDU from the STA1 through the link 1. The AP may transmit a reception response for the PPDU to the STA1 on the link 1. In the uplink transmission period #3, the STA3 may transmit a PPDU to the AP through the link 2, and the AP may receive the PPDU from the STA3 through the link 2. The AP may transmit a reception response for the PPDU on the link 2. Here, the reception response for the PPDU may be a multi-STA BA. The multi-STA BA may be used to inform that the sharing of TXOP has been terminated. The multi-STA BA may be transmitted to a plurality of communication nodes (e.g., STA1, STA2, STA3). The STA1 (e.g., TXOP holder) that has received the multi-STA BA may determine that the sharing of the TXOP has been terminated.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of an access point (AP) in a communication system, the operation method comprising:
configuring a transmission opportunity (TXOP);
generating a trigger frame indicating TXOP sharing;
transmitting the trigger frame to a first station (STA) which is a target of the TXOP sharing;
receiving a response frame for the trigger frame from the first STA; and
performing a transmission and reception operation between the AP and the first STA at predefined time intervals in a TXOP sharing time period allocated by the trigger frame without a channel contention,
wherein the TXOP sharing time period exists in the TXOP, and the trigger frame includes a first field indicating an identifier of the first STA being the target of the TXOP sharing, a second field indicating the TXOP sharing time period, a fourth field indicating whether the TXOP sharing is allowed, and a resource unit (RU) allocation field indicating a frequency resource allocated to the first STA.

2. The operation method according to claim 1, wherein a second data frame of the first STA is transmitted to the AP or a second STA in the TXOP sharing time period.

3. The operation method according to claim 1, wherein the trigger frame further includes a third field indicating a link in which the TXOP is shared.

4. An operation method of a first station (STA) in a communication system, the operation method comprising:
receiving a trigger frame indicating transmission opportunity (TXOP) sharing from an access point (AP);
identifying a TXOP sharing time period allocated by the trigger frame;
transmitting a response frame for the trigger frame to the AP; and
transmitting a first data frame without a channel contention in the TXOP sharing time period belonging to a TXOP,
wherein the TXOP is configured by the AP, the TXOP sharing time period exists in the TXOP, the first station is a target of the TXOP sharing, and the trigger frame includes a first field indicating an identifier of the first STA being the target of the TXOP sharing, a second field indicating the TXOP sharing time period, a fourth field indicating whether the TXOP sharing is allowed, and a resource unit (RU) allocation field indicating a frequency resource allocated to the first STA.

5. The operation method according to claim 4, wherein the first data frame of the first STA is transmitted to the AP or a second STA in the TXOP sharing time period.

6. The operation method according to claim 4, wherein the trigger frame further includes a third field indicating a link in which the TXOP is shared.

7. An operation method of an access point (AP) in a communication system, the operation method comprising:
- configuring a transmission opportunity (TXOP);
- generating a trigger frame indicating TXOP sharing; and transmitting the trigger frame to a first station (STA) which is a target of the TXOP sharing; and
- receiving a response frame for the trigger frame from the first STA,
- wherein a TXOP sharing time period exists in the TXOP and the trigger frame includes a first field indicating an identifier of the first STA being the target of the TXOP sharing, a second field indicating the TXOP sharing time period, a fourth field indicating whether the TXOP sharing is allowed, and a resource unit (RU) allocation field indicating a frequency resource allocated to the first STA.

8. The operation method according to claim 7, wherein the trigger frame further includes a third field indicating a link in which the TXOP is shared.

* * * * *